(12) United States Patent
Goto et al.

(10) Patent No.: US 6,323,968 B1
(45) Date of Patent: Nov. 27, 2001

(54) PICTURE READING APPARATUS

(75) Inventors: Makoto Goto, Kanagawa; Fumihiko Kaise, Tokyo; Hideki Wanami, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/154,356

(22) Filed: Sep. 16, 1998

Related U.S. Application Data

(62) Division of application No. 08/776,426, filed as application No. PCT/JP96/01595 on Jun. 12, 1996, now Pat. No. 5,986,773.

(30) Foreign Application Priority Data

Jun. 13, 1995 (JP) .................................................... 7-146359

(51) Int. Cl.$^7$ ........................................................ H04N 1/04
(52) U.S. Cl. ............................ 358/487; 358/444; 358/404
(58) Field of Search .................................. 358/487, 506, 358/404, 444, 505, 474, 527, 452; 348/96, 97, 231

(56) References Cited

U.S. PATENT DOCUMENTS

| 5,157,482 | 10/1992 | Cosgrove | 348/97 |
| 5,461,492 | 10/1995 | Jones | 358/487 |
| 5,473,370 | 12/1995 | Moronaga et al. | 348/231 |
| 5,706,050 | 1/1998 | Nishimura et al. | 348/97 |
| 5,767,904 | 6/1998 | Miyake | 348/362 |
| 5,986,773 | * 11/1999 | Goto et al. . | |

FOREIGN PATENT DOCUMENTS

| 4-217164 | 8/1992 | (JP) | H04N/1/387 |
| 4-362849 | 12/1992 | (JP) | H04N/1/00 |
| 6-123923 | 5/1994 | (JP) | G03B/27/32 |
| 6-268822 | 9/1994 | (JP) | H04N/1/04 |
| 7-203184 | 8/1995 | (JP) | H04N/1/387 |

* cited by examiner

Primary Examiner—Cheukfan Lee
(74) Attorney, Agent, or Firm—Bell, Boyd & Lloyd LLC

(57) ABSTRACT

Plural pictures recorded on an optical film are read, in frame units, by a scanner 11 to convert them into electric picture data to store those picture data into a main memory 21. A memory control section 2 controls read-out and write-in operations of the picture data obtained from the scanner 11 with respect to the main memory 21. Further, the memory control section 2 controls the write-in and read-out operations of the picture data to thereby obtain inverted picture data in which (relative position of) the picture data is inverted in regard to upper and lower directions thereof. A system control section 5 controls the memory control section 2 in accordance with inverting command from a keyboard 6 so as to obtain inverted picture data. Since the write-in or read-out operation of the picture data with respect to the main memory 21 is controlled by the system control section 5 so as to invert (relative position of) picture data in regard to upper and lower directions thereof in accordance with the inverting command from the keyboard 6, in the case where inverted picture in which the upside is turned down is displayed on a display section 7, the inverting command is given, thereby making it possible to display, on the display section 7, erecting (normally standing) pictures of respective frames in which relative position in regard to upper and lower directions is inverted, and to record the erecting pictures of respective frames onto a recording medium by a disc drive 42.

5 Claims, 21 Drawing Sheets

PICTURE READING APPARATUS
ACCORDING TO THIS INVENTION

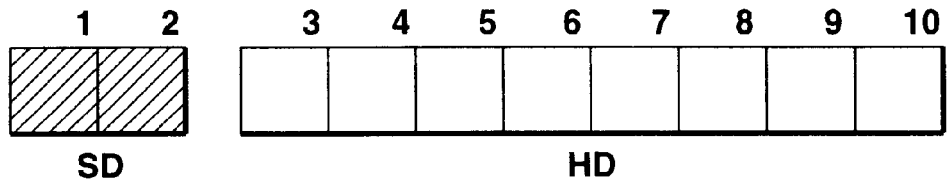
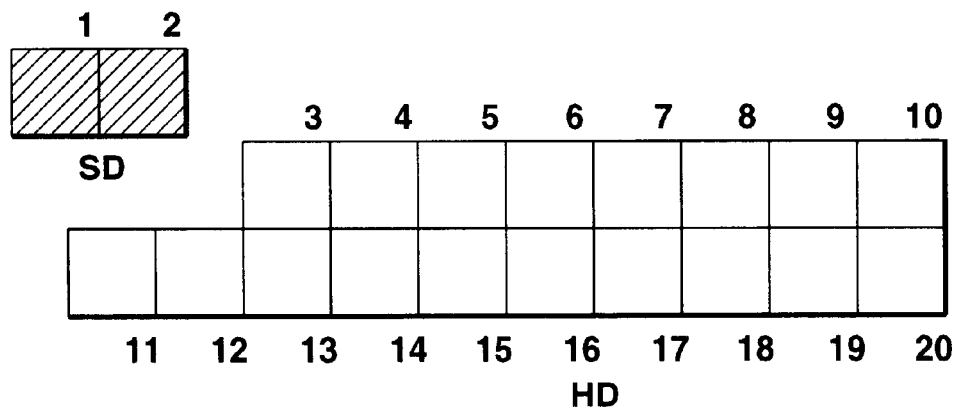
PICTURE DATA
STRUCTURE OF MD
FIG.2

NO. OF REMAINING FRAMES/NO. OF
REMAINING ALBUMS ACQUISTION FLOW

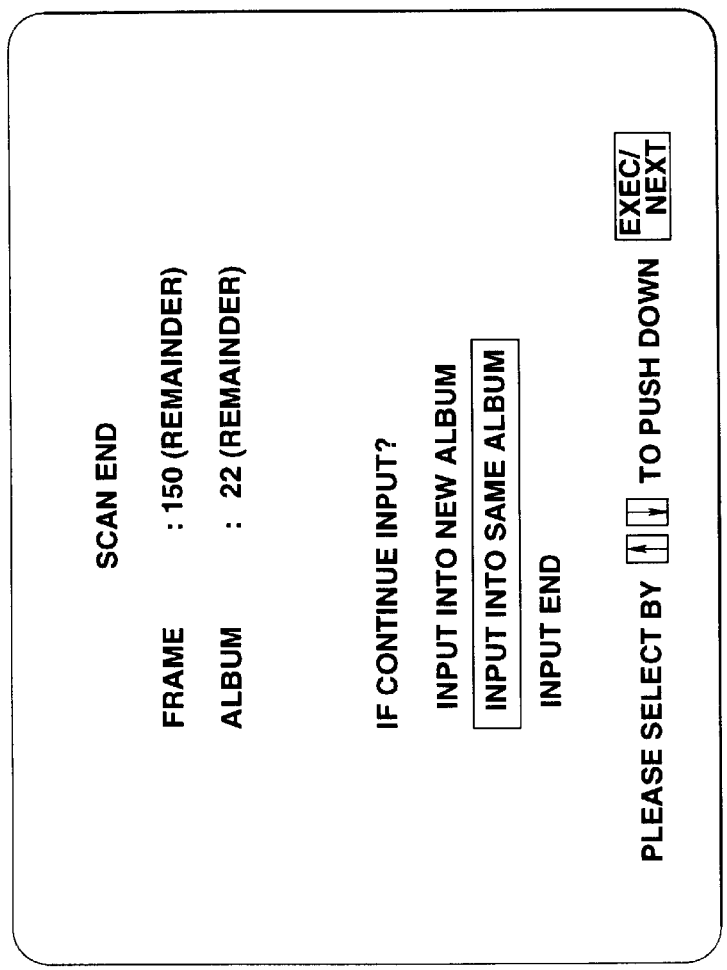

PICTURE READING APPARATUS

This application is a Division of 08/776,426 filed Jan. 29, 1997, now U.S. Pat. No. 5,986,773, which was the National Stage of International appl. No. PCT/JP96/01595, filed Jun. 12, 1996.

TECHNICAL FIELD

This invention relates to a picture reading apparatus adapted for reading pictures recorded in frame units on an optical film to record picture data of respective frames thus read onto a rewritable recording medium.

BACKGROUND ART

Nowadays, application field of the digital picture processing has been rapidly spread, and such digital picture processing has been put into practical use in actual industrial fields like atomization of inspection by visual observation. On the other hand, the kind of digital picture processing objects has been explodedly increased.

For example, there are picture reading apparatuses in which a flat bed type scanner (hereinafter simply referred to as scanner) as the computer peripheral equipment is used to read, as digital pictures, pictures recorded in frame units on an optical film (hereinafter simply referred to as film) to record the digital pictures thus read onto a recording medium. As a recording medium adapted so that digital pictures are recorded in such picture reading apparatus, e.g., rewritable digital disc using magneto-optical disc (hereinafter simply referred to as disc) is used.

In such picture reading apparatus, pictures of respective frames recorded on the film are first read in succession by the scanner. At this time, user carries out, every frames, in succession, comparison between the remaining capacity of the disc and sizes of pictures of respective frames which have been read by the scanner to issue write instructions, e.g., by key input operation, etc. in dependency upon the comparison result so that pictures of respective frames recorded on the film are recorded in succession on the disc. Moreover, such a picture reading apparatus is adapted to have ability of providing, by laser printer as the computer peripheral equipment, print-out of index information (hereinafter referred to as index print) of the disc on which pictures of respective frames have been recorded in a manner as described above.

However, in a picture reading apparatus as described above, it was required for user to carry out, every time, comparison between the remaining capacity of the disc and sizes of pictures that he desires to record in order to confirm how many number of pictures can be recorded from now on the disc. Since it was necessary to carry out such a very troublesome work, particularly, in the case of reading a large quantity of films at a high speed to carry out recording, or the like, user could not efficiently carry out work.

Moreover, in the case of recording pictures of about 100 frames into the same directory of the disc, such pictures are recorded in succession in order of issuance of write instructions of pictures to be recorded. For this reason, classification of pictures after recording was very difficult. Namely, in such a case, since when an arbitrary picture is taken out from the directory within which pictures of about 100 frames are recorded, it was necessary to carry out retrieval in succession from the picture recorded first, such retrieval operation was very troublesome. Further, since according as the number of recorded pictures becomes greater, the speed of retrieval becomes lower accordingly, the working efficiency became further poor. For example, in the picture reading apparatus adapted for recording pictures onto the photo digital disc, it is possible to record pictures of about 100 frames on a single disc. However, in the case where such picture reading apparatus is used to record, onto the photo compact disc, plural films of which photographing places are entirely different from each other, such as, for example, photographs such as athletic sports, travel, and the like, the work for searching switching point between the films while looking at the index print was required in order to recognize the switching point between the films in the photo compact disc.

In addition, in a picture reading apparatus as described above, when the film is set (loaded) in the state where the inside is turned out with respect to the reading apparatus, pictures on the film would be disposed in the state reversed in regard to upper and lower directions, or in the state reversed in regard to left and right directions with respect to the CCD line sensor for reading pictures. Accordingly, when reading of pictures on the film is carried out by the CCD line sensor in such a state, not only picture images in the state reversed with respect to upper and lower directions or in the state reversed in left and right directions would be displayed on monitor, but also picture images in the state reversed with respect to upper and lower directions or in the state reversed in left and right directions would be recorded on the disc.

This invention has been made in view of actual circumstances as described above, and has objects as described below.

Namely, an object of this invention is to provide a picture reading apparatus adapted for rapidly and securely reading, in succession, pictures of respective frames recorded on an optical film to record those pictures onto a recording medium, and for displaying, on monitor, the number of remaining frames which can be recorded onto the recording medium, thereby making it possible to improve the working efficiency.

Another object of this invention is to provide a picture reading apparatus which has a function to invert (relative position of) pictures with respect to upper and lower directions thereof in accordance with inverting command, thereby making it possible to improve the working efficiency.

DISCLOSURE OF THE INVENTION

A picture reading apparatus according to this invention is directed to a picture reading apparatus comprising: picture reading means for moving an optical film on which plural pictures are recorded in frame units to read, in the frame units, the pictures recorded on the optical film to convert them into electric picture data; memory means for temporarily storing the picture data obtained by the picture reading means; signal processing means for implementing processing to the picture data obtained by the picture reading means; recording means for recording, onto a recording medium, the picture data to which the processing has been implemented by the signal processing means; and control means for carrying out control of respective operations of the picture reading means, the memory means, the signal processing means and the recording means, thus to successively read, in the frame units, the plural pictures recorded on the optical film to record the picture data of respective frames onto the recording medium by the recording means, characterized in that the apparatus comprises number of remaining frames detecting means for detecting the number of remaining frames which can be recorded onto the recording medium by the recording means, and display means for displaying remaining frames detected by the number of remaining frames detecting means.

As stated above, in the picture reading apparatus according to this invention, since the number of remaining frames which can be recorded onto the recording medium by the recording means is detected by the number of remaining frames detecting means to display remaining frames on the display means, user is permitted to intuitively and concretely recognize the number of remaining frames. Thus, the working efficiency can be improved.

In this picture reading apparatus, the number of remaining frames detecting means can calculate the number of remaining frames from, e.g., the number of recordable frames and the number of recorded (already recorded) frames of the recording medium. Moreover, in this picture reading apparatus, the number of remaining frames corresponding to resolution of picture set by resolution setting means which sets resolution of picture to be recorded onto the recording medium is calculated by the number of remaining frames detecting means, thereby making it possible to display the number of remaining frames corresponding to the resolution on the display means. Thus, user is permitted to intuitively and concretely recognize precise number of remaining frames corresponding to the resolution. As a result, the working efficiency can be improved.

A picture reading apparatus according to this invention is directed to a picture reading apparatus comprising: picture reading means for moving an optical film on which plural pictures are recorded in frame units to read, in the frame units, the pictures recorded on the optical film to convert them into electric picture data; memory means for temporarily storing the picture data obtained by the picture reading means; signal processing means for implementing processing to the picture data obtained by the picture reading means; picture display means for displaying picture based on the picture data to which the processing has been implemented by the signal processing means; recording means for recording, onto a recording medium, the picture data to which the processing has been implemented by the signal processing means; and control means for carrying out control of respective operations of the picture reading means, the memory means, the signal processing means and the recording means, thus to successively read, in the frame units, the plural pictures recorded on the optical film to record the picture data of respective frames onto the recording medium by the recording means, characterized in that the apparatus comprises inverting command means for delivering, to the control means, inverting command for inverting (relative position of) the picture data in regard to upper and lower directions thereof under control of write-in or read-out operation with respect to the memory means, and that the control means controls the write-in or read-out operation of picture data with respect to the memory means so as to invert (relative position of) the picture data in regard to the upper and lower directions thereof in accordance with the inverting command from the inverting command means.

As stated above, in the picture reading apparatus according to this invention, since write-in or read-out operation of picture data with respect to the memory means is controlled by the control means so as to invert (relative position of) picture data in regard to upper and lower directions thereof in accordance with the inverting command from the inverting command means, in the case where inverted picture image inverted in regard to upper and lower directions (i.e., the upside is turned down) is displayed on the picture display means, the inverting command is given, thereby making it possible to display, on the picture display means, erecting (normally standing) pictures of respective frames inverted in regard to upper and lower directions, and to record erecting (normally standing) pictures of respective frames also onto the recording medium. Thus, user can rapidly and precisely confirm pictures of respective frames. Accordingly, the working efficiency can be improved.

In this picture reading apparatus, the control means is operative so that when the inverting command from the inverting command means is given, it can control write-in or read-out operation of picture data with respect to the memory means so as to respectively obtain inverted picture data with respect to all pictures on the optical film.

Moreover, a picture reading apparatus according to this invention is directed to a picture reading apparatus comprising: picture reading means for moving an optical film on which plural pictures are recorded in frame units to read, in the frame units, the pictures recorded on the optical film to convert them into electric picture data; memory means for temporarily storing the picture data obtained by the picture reading means; signal processing means for implementing correction processing to the picture data obtained by the picture reading means; picture display means for displaying picture based on the picture data to which the correction processing has been implemented by the signal processing means; recording means for recording, onto a recording medium, the picture data to which the correction processing has been implemented by the signal processing means; and control means for carrying out control of respective operations of the picture reading means, the memory means, the signal processing means and the recording means, thus to successively read, in the frame units, the plural pictures recorded on the optical film to record the picture data of respective frames onto the recording medium by the recording means, characterized in that the control means is caused to carry out a control to allow respective operations of the picture reading means, the memory means, the signal processing means and the recording means to correspond to prescan and (main) scan, whereby, in the prescan, the reading means is caused to move the optical film in a forward direction to successively read, in frame units, pictures of all frames recorded on the optical film to store the picture data of the respective frames into the memory means; and, in the (main) scan, correction condition by the signal processing means is set on the basis of the picture data of the respective frames stored in the memory means by the prescan to allow the reading means to move the optical film in a backward direction to successively read, in frame units, the pictures of all frames recorded on the optical film to record, onto the recording medium, the picture data of the respective frames to which the correction processing has been implemented by the signal processing means.

As stated above, in the picture reading apparatus according to this invention, since the prescan and the (main) scan are carried by one reciprocating operation, it is possible to rapidly and securely read pictures of respective frames recorded on the film. As a result, the processing time can be reduced. Thus, the working efficiency can be improved.

In this picture reading apparatus, the number of remaining frames which can be recorded onto the recording medium by the recording means is detected by the number of remaining frames detecting means to display the remaining frames on the display means, thereby permitting user to intuitively and concretely recognize the number of remaining frames. Thus, the working efficiency can be further improved. In this picture reading apparatus, the number of remaining frames detecting means can calculate the number of remaining frames, e.g., from the number of recordable frames and the number of recorded (already recorded) frames of the recording medium. Moreover, in this picture reading apparatus, the number of remaining frames corresponding to resolution of a picture set by resolution setting means for setting resolution of picture to be recorded onto the recording medium is calculated by the number of remaining frames detecting means, thereby making it possible to display the number of remaining frames corresponding to the resolution on the display means. Thus, user is permitted to intuitively and concretely the precise number of remaining frames corresponding to the resolution. As a result, the working efficiency can be improved. Further, in this picture reading apparatus, in the case where an inverted picture image in which the upside is turned down is displayed on the picture display means, write-in or read-out operation of picture data with respect to the memory means is controlled by the control means so as to invert (relative position of) picture data in regard to the upper and lower directions thereof in accordance with inverting command from the inverting command means, thereby making it possible to display, on the picture display means, erecting picture images of respective frames inverted in regard to the upper and lower directions, and to record the erecting picture images of respective frames also on the recording medium. Thus, user can rapidly and precisely confirm pictures of respective frames. Accordingly, the working efficiency can be improved.

Further, a picture reading apparatus according to this invention is characterized by the provision of picture reading means for reading, in frame units, plural pictures recorded on an optical film to convert them into electric picture data; picture display means for displaying the picture data obtained by the picture reading means; and control means for controlling the picture reading means and the display means so as to display, on the picture display means, data indicating reading order of the picture data obtained by the reading means simultaneously with the reading operation for reading, every respective frames, the pictures of the optical film by the picture reading means.

As stated above, in the picture reading apparatus according to this invention, since the picture reading means and the display means are controlled by the control means so as to display, on the picture display means, data indicating the reading order of the picture data obtained by the reading means simultaneously with the reading operation for reading, every respective frames, the pictures of the optical film by the picture reading means, user is permitted to precisely recognize the reading order of the picture data. Thus, the working efficiency can be improved.

Further, a picture reading apparatus according to this invention is characterized by the provision of picture reading means for reading, in frame units, plural pictures recorded on an optical film to convert them into electric picture data; memory means for temporarily storing the picture data obtained by the picture reading means; signal processing means for implementing processing to the picture data obtained by the picture reading means; recording means for recording, onto a recording medium, the picture data to which the processing has been implemented by the signal processing means; control means for controlling the operation of the picture reading means so as to correspond to prescan operation and (main) scan operation, and for delivering read-out address to the memory means; and inverting command means for delivering, to the control means, inverting command for obtaining inverted picture data inverted in regard to upper and lower directions thereof (i.e., relative position is inverted in regard to upper and lower directions) with respect to the picture data stored in the memory means, wherein the control means is operative so that when inverting command is given thereto from the inverting command means at the time of pre-scan, it delivers inverting read-out addresses to the memory means in reading out all picture data on the optical film temporarily stored in the memory means at the time of (main) scan.

As stated above, in the picture reading apparatus according to this invention, when inverting command is given (delivered) from the inverting command means to the control means at the time of pre-scan, the control means delivers inverting read-out addresses to the memory means in reading out all picture data on the optical film temporarily stored in the memory means. Accordingly, it is possible to display picture reasonable (correct) with respect to (the positional relationship in regard to) the upper and lower directions on the picture display means. Thus, user can rapidly and precisely confirm pictures of respective frames. As a result, the working efficiency can be improved.

Further, a picture reading apparatus according to this invention is characterized by the provision of picture reading means for reading, in frame units, plural pictures recorded on an optical film to convert them into electric picture data; memory means for temporarily storing the picture data obtained by the picture reading means; signal processing means for implementing processing to the picture data obtained by the picture reading means; recording means for recording, onto a recording medium, the picture data to which the processing has been implemented by the signal processing means; control means for controlling the operation of the picture reading means so as to correspond to pre-scan operation and (main) scan operation, and for delivering read-out address to the memory means; and inverting command means for delivering, to the control means, inverting command for obtaining inverted picture data inverted in regard to upper and lower directions thereof (i.e., relative position is inverted in regard to upper and lower directions) with respect to the picture data stored in the memory means, wherein the control means is operative so that after the inverting command is given thereto from the inverting command means, it delivers, to the memory means, inverting read-out addresses with respect to all the picture data in reading out the picture data from the memory means so as to respectively obtain the inverted picture data corresponding to all the picture data on the same optical film.

As stated above, in the picture reading apparatus according to this invention, after the inverting command is given from the inverting command means to the control means, the control means delivers, to the memory means, the inverting read-out addresses with respect to all the picture data in reading out picture data from the memory means so as to respectively obtain inverted picture data corresponding to all picture data on the same optical film. Accordingly, it is possible to display picture image reasonable (correct) with respect to (the positional relationship in regard to) upper and lower directions on the picture display means. Thus, user is permitted to rapidly and precisely confirm pictures of respective frames. As a result, the working efficiency can be improved.

BRIEF DESCRIPTION OF THE DRAWINGS

FIG. 2 is a view for explaining the configuration of picture data of disc.

FIG. 21 is a view for explaining (main) scan end picture for film cut every six (6) frames displayed on the display section.

BEST MODE FOR CARRYING OUT THE INVENTION

The best mode (form) for carrying out this invention will now be described in detail with reference to the attached drawings.

Figure 1:
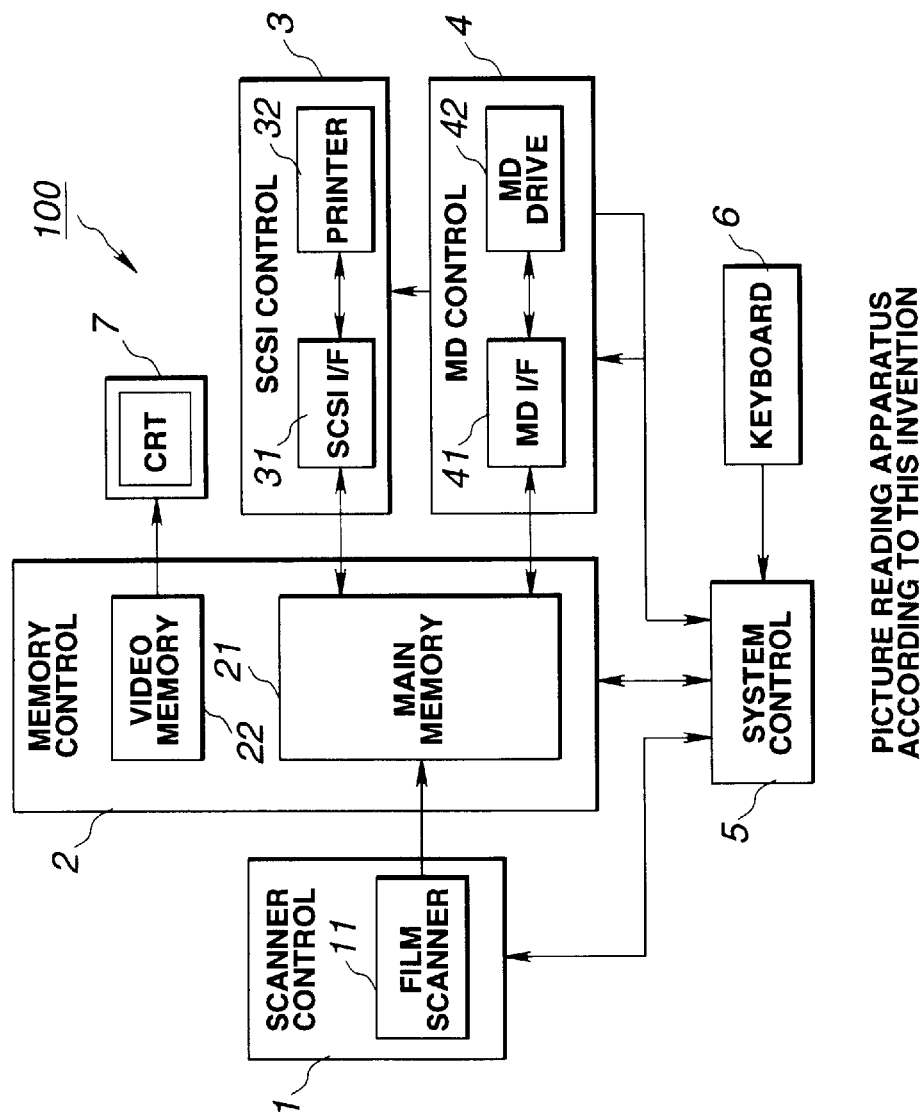
FIG. 1 is a block diagram showing the configuration of a picture reading apparatus according to this invention.

This invention is applied to a picture reading apparatus 100 as shown in FIG. 1, for example. The picture reading apparatus 100 shown in FIG. 1 comprises a scanner 11 controlled by a scanner control section 1, a main memory 21 and a video memory 22 controlled by a memory control section 2, a printer interface section 31 and a printer 32 controlled by a printer control section 3, a disc interface section 41 and a disc drive 42 controlled by a disc control section 4, a keyboard 6, a display section 7, and a system control section 5 for carrying out operation control of the entirety of the apparatus.

An output of the scanner 11 is delivered to the main memory 21. Moreover, an output of the main memory 21 is delivered to the display section 7 through the video memory 22.

Transmission/reception of data between the main memory 21 and the printer 32 is carried out through the printer interface section 31. Moreover, transmission/reception of data between the main memory 21 and the disc drive 42 is carried out through the disc interface section 41.

Key operation information at the keyboard 6 is delivered to the system control section 5.

Initially, the system control section 5 carries out operation control of the scanner control section 1, the memory control section 2, the printer control section 3 and the disc control section 4, etc. so that operation based on the key operation of the keyboard 6 is carried out, and so that operations corresponding to the prescan and the (main) scan are carried out.

The scanner 11 comprises film feed mechanism for moving an optical film, and picture reading section for successively (sequentially) reading, in frame units, pictures of respective frames recorded on the optical film to convert them into electric picture data. The film feed mechanism includes film feed motor, and is caused to undergo drive control on the basis of control of the scanner control section 1 to carry out feed in the forward direction and feed in the backward direction of the optical film. In addition, the picture reading section is comprised of CCD (Charge Coupled Device) line sensor, and serves to successively (sequentially) read pictures of respective frames recorded on the optical film to convert them into electric picture data to output the picture data thus obtained as digital picture data.

The reading resolution of the scanner 11 as described above is 1024×1536 pixels based on the HD (High Definition) system (hereinafter referred to as HD resolution) and 2048×3072 pixels based on the UD (Ultra Definition) system (hereinafter referred to as UD resolution). Moreover, the scanner 11 is adapted to have ability of handling three kinds of optical films (hereinafter simply referred to as film) of long (picture) film or film cut every 6 frames of the 35 mm negative/reversal film, 35 mm slide mount and Advanced Photo System (hereinafter abbreviated as APS) film (mainly developed) by the Kodak company. In the picture reading apparatus 100 of this example, the system control section 5 is adapted so that, at the time of prescan, the system control section 5 controls the scanner control section 1 so that the optical film is caused to undergo feed in the forward direction, and at the time of (main) scan, the system control section 5 controls the scanner control section 1 so that the optical film is caused to undergo feed in the backward direction.

Moreover, in this picture reading apparatus 100, the system control section 5 is adapted to set the condition of the correction processing in the signal processing section on the basis of picture data of respective frames stored in the main memory 21 at the time of prescan. The signal processing section is adapted to implement signal processing such as correction processing, etc. to picture data of respective frames stored in the main memory 21 at the time of (main) scan by using the condition of the correction processing set by the system control section 5 to sequentially store, as reproduction picture data, the picture data of respective frames to which the signal processing has been implemented into the video memory 22.

The video memory 22 is adapted to deliver, to the display section 7, picture data of respective frames stored therein at a predetermined read-out timing on the basis of control of the memory control section 2. Moreover, picture data, e.g., initial picture, mode setting picture and various message pictures, e.g., picture for presenting the number of remaining frames of recording medium which will be described later, etc., which will be described later, are set (stored) in advance in the video memory 22.

The display section 7 is comprised of, e.g., CRT (Cathode Ray Tube) of 384×576 pixels, and is adapted to have ability of carrying out character display by 12 lines×24 characters each consisting of 32×24 pixels. Picture image based on reproduction picture data from the video memory 22, and the initial picture, the mode setting picture and the various message pictures, etc. are displayed on the display section 7.

On the other hand, the disc drive 42 records, onto a set (loaded) recording medium, picture data of respective frames to which signal processing such as correction processing, etc. has been implemented at the signal processing section, which are delivered through the disc interface section 41 from the main memory 21. The recording medium handled in this disc drive 42 is, e.g., rewritable digital disc using magneto-optical disc (hereinafter simply referred to as disc).

The disc is adapted as shown in FIG. 2 so that picture of one frame of the HD resolution is recorded into the recording area of 10 clusters in total of picture SD (Standard Definition) for display of the display section 7 of 2 clusters and picture HD of the HD resolution of 8 clusters. Moreover, picture of one frame of the UD resolution is recorded into the recording area of 20 clusters in total of picture SD for display of the display section 7 of 2 clusters and picture UD of the UD resolution of 18 clusters. In this case, data quantity of one cluster is assumed to be 64 K bytes (64 K bytes/cluster) and the picture SD is assumed to be 640×480 pixels.

Accordingly, disc as described above is adapted so that in the case of only pictures of the HD resolution, 200 frames can be recorded thereonto, and in the case of only pictures of the UD resolution, 100 frames can be recorded thereonto. Moreover, pictures of the HD resolution and pictures of the UD resolution may be recorded onto the disc in the mixed state.

Further, the disc is assumed to be formatted in accordance with a predetermined system. The number of albums which can be recorded onto the disc in accordance with the format of the predetermined system is assumed to be, e.g., 25 at the maximum.

Figure 3:
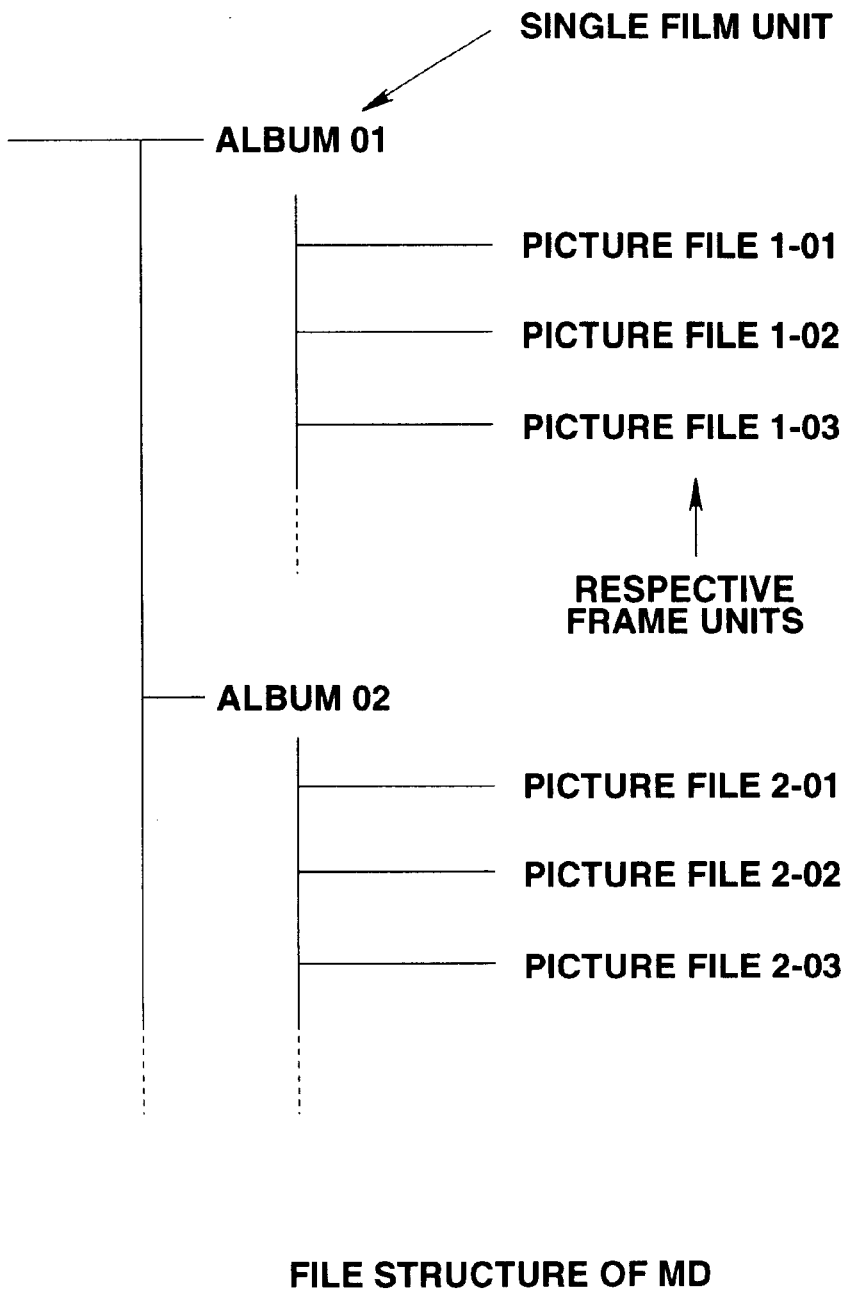
FIG. 3 is a view for explaining file configuration of the disc.

In addition, in this picture reading apparatus 100, as shown in FIG. 3, picture data 1-01, 1-02, 1-03, of respective frames on a single film are adapted to be recorded into a single album 01. Namely, single film is handled as a single album.

The printer 32 carries out, on the basis of control of the printer control section 3, print-out of various information delivered through the printer interface section 31 from the main memory 21, e.g., index information, etc. of the disc which will be described later. It is to be noted that, in this picture reading apparatus 100, the index print is assumed to be in ON state.

Figure 4:
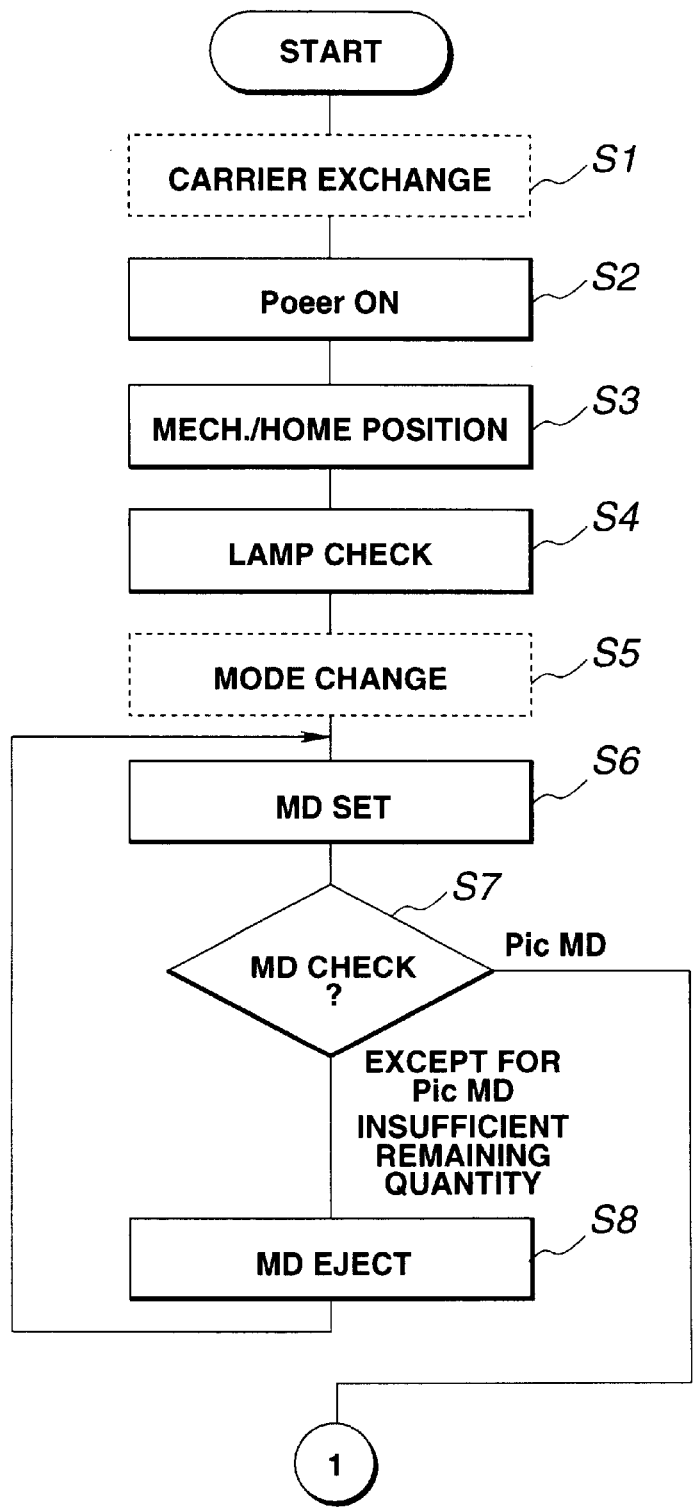
FIG. 4 is a flowchart showing processing of step S1~step S8 in the operation processing of the picture reading apparatus.
Figure 5:
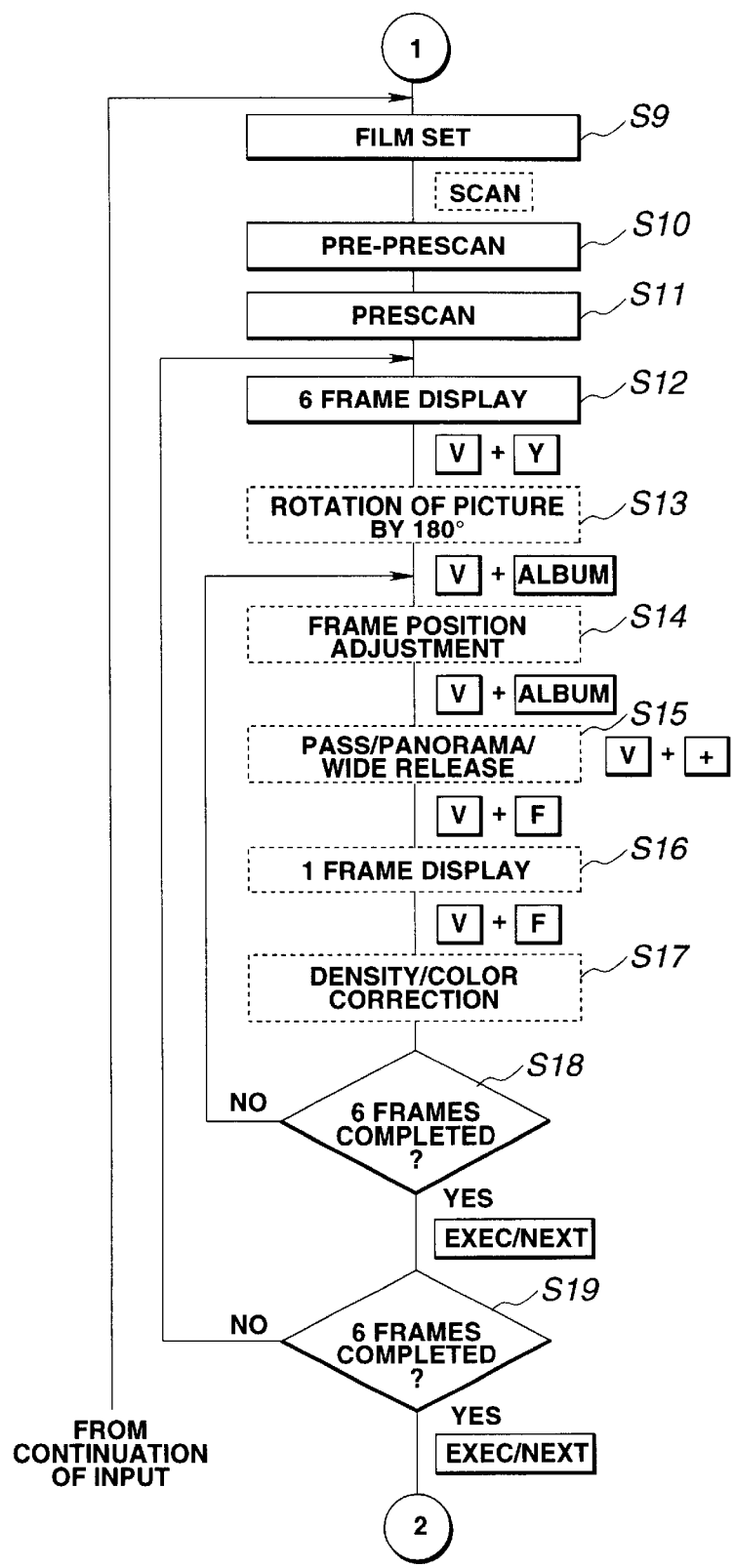
FIG. 5 is a flowchart showing processing of step S9~step S19 in the operation processing of the picture reading apparatus.
Figure 6:
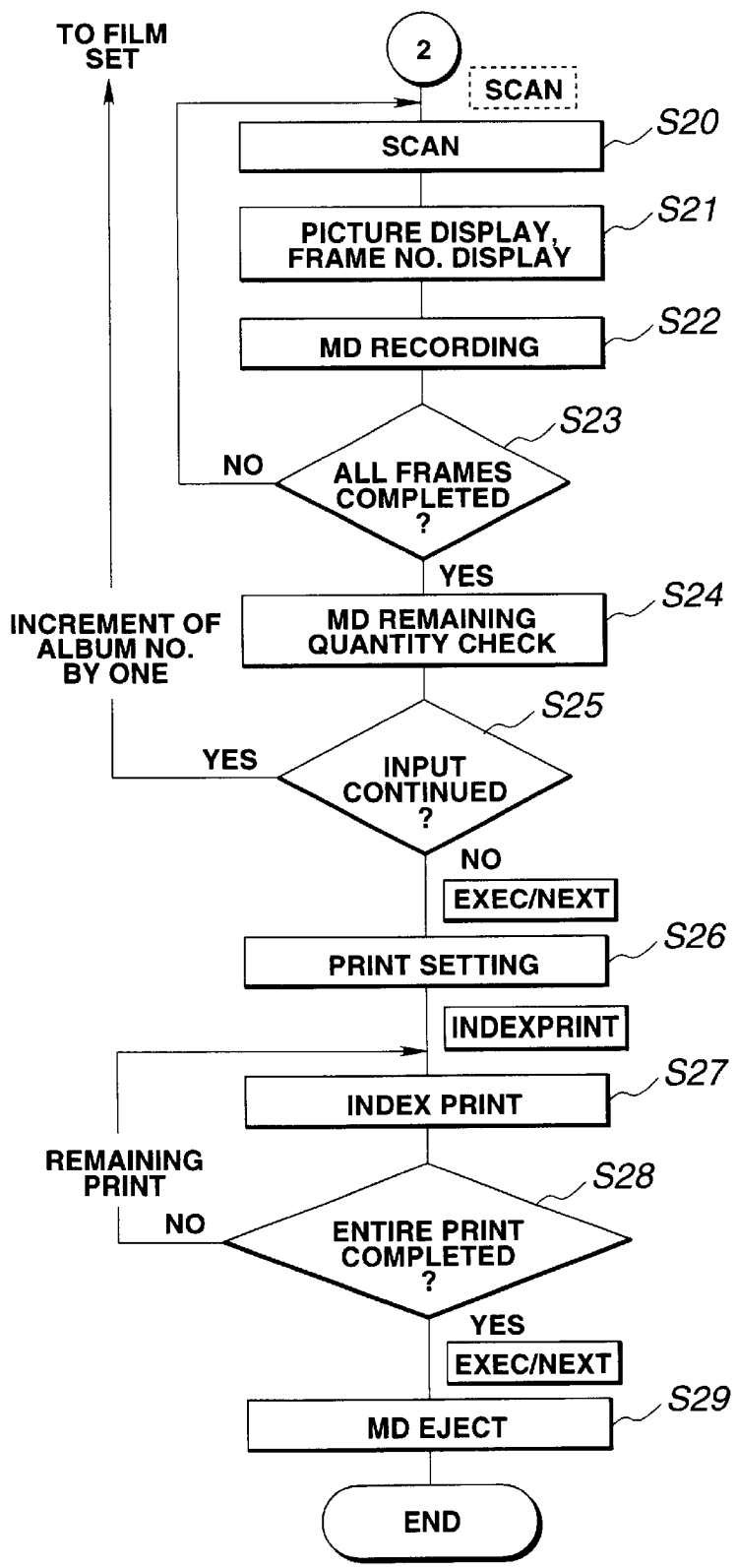
FIG. 6 is a flowchart showing processing of step S20~step S28 in the operation processing of the picture reading apparatus.

FIGS. 4, 5 and 6 are flowcharts showing operation in the picture reading apparatus 100 and the operation within the system thereof. Explanation will be given with reference to the block diagram of the above-described picture reading apparatus 100 shown in FIG. 1 and the flowcharts shown in FIGS. 4, 5 and 6.

Initially, as shown in the FIG. 4 mentioned above, user carries out exchange into carrier for sleeve, for mount or for APS corresponding to the film as occasion demands (step S1). In this picture reading apparatus 100, e.g., long picture film is assumed to be handled. Accordingly, exchange into the carrier for sleeve is carried out.

Then, user allows power supply of the picture reading apparatus 100 to be placed in ON state (step S2).

When the power supply is placed in ON state, components of the picture reading apparatus 100 are respectively brought into starting initial state. For example, the scanner control section 1 conducts a control so that the scanner 11 is moved to a predetermined initial position (step S3).

Figure 7:
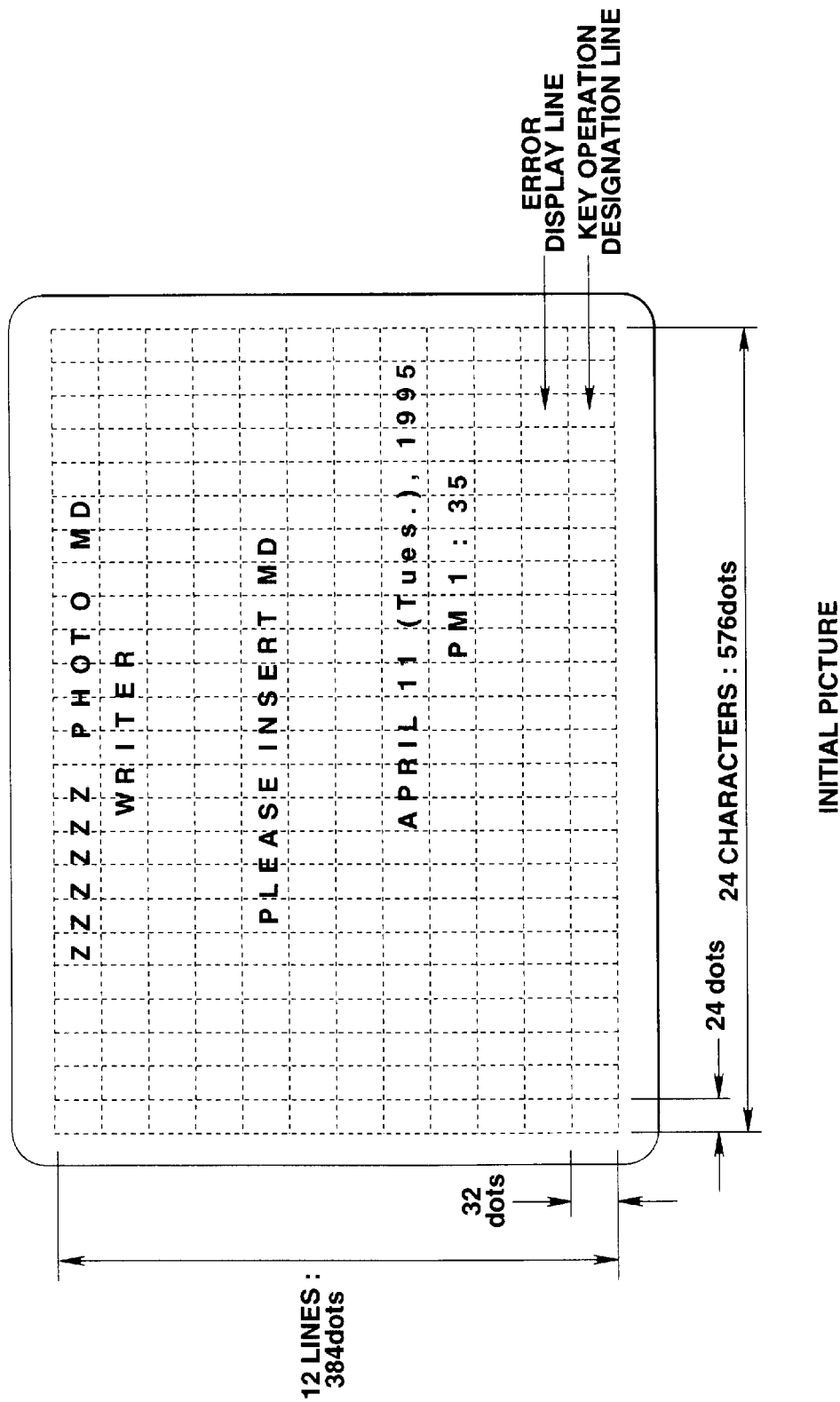
FIG. 7 is a view for explaining initial picture displayed on display section.

Moreover, as described above, the system control section 5 controls the memory control section 2 so that, e.g., the initial picture data among plural picture (on screen) data set (stored) in advance in the video memory 22 is delivered to the display section 7. Thus, the initial picture data is delivered from the video memory 22 to the display section 7. As a result, an initial picture as shown in FIG. 7 is displayed on the display section 7.

Then, user checks the light source by the CCD line sensor of the scanner 11. In the case where lamp is burnt (burned) out (broken), he exchanges the lamp (step S4).

Then, user operates the keyboard 6 in accordance with instruction of the key operation of the initial picture shown in the FIG. 5 mentioned above as occasion demands to thereby issue mode change command for setting the kind of the film and the recording resolution.

When this mode change command is issued, the system control section 5 controls the memory control section 2 so that mode setting picture data set (stored) in advance in the video memory 22 is delivered to the display section 7. Accordingly, a mode setting picture as shown in FIG. 8 is displayed on the display section 7.

Figure 8:
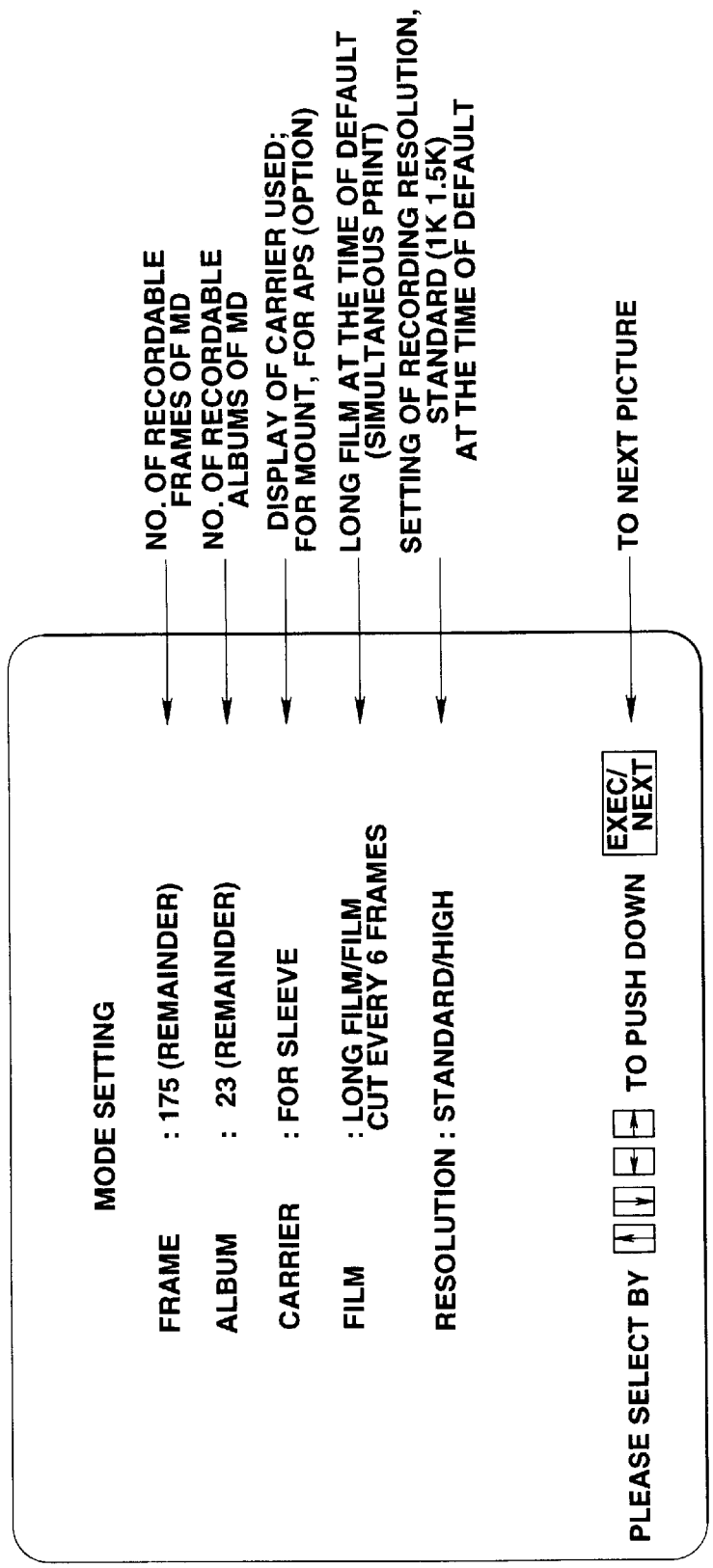
FIG. 8 is a view for explaining mode setting picture displayed on the display section.

In the case of the mode setting picture shown in the FIG. 8 mentioned above, the kind of the film and the recording resolution can be set by arrow "→", "←", "↑", "↓" keys of the keyboard 6. Moreover, information of the number of remaining frames & the number of remaining albums and carrier used at present which will be described later are displayed. Further, in the above-mentioned mode setting picture, next picture is displayed by "EXEC/NEXT" key of the keyboard 6.

In the mode setting picture as described above, as the kind of the film, any one of the long (picture) file or film cut every 6 frames of the 35 mm negative/reversal film, 35 mm slide mount film and APS film can be set. As the recording resolution, any one of the standard mode of the HD resolution and the high resolution mode of the UD resolution can be set. In this case, at the time of default, the kind of the film is set to the long film, and the resolution of the film is set to the standard mode.

Accordingly, in this picture reading apparatus 100, user operates the keyboard 6 to thereby set the kind of the film to the long film, and to set the recording resolution to the standard mode. Thus, the system control section 5 carries out various controls so that operations based on various modes thus set are conducted (step S5).

After mode setting processing as described above has been completed, user operates "EXEC/NEXT" key of the keyboard 6 in the mode setting picture. Thus, the system control section 5 controls the memory control section 2 so that the initial picture data of the previous picture is delivered to the display section 7. Accordingly, the initial picture shown in the FIG. 7 mentioned above which is the previous picture is displayed on the display section 7.

Then, user set (loads) the disc onto the disc drive 42 (step S6).

When the disc is set (loaded), the disc control section 4 judges on the basis of control of the system control section 5 whether or not the disc thus set (loaded) is formatted in conformity with the format of a predetermined system, and carries out calculation of the number of remaining frames and the number of remaining albums which will be described later in the disc (step S7). Then, the disc control section 4 delivers judgment result and calculation result to the system control section 5.

The system control section 5 is operative so that, on the basis of the judgment result and the calculation result from the disc control section 4, in the case where it has been indicated that the set (loaded) disc is not formatted in conformity with the format of the predetermined system, or in the case where it has been indicated that the number of remaining frames and the number of remaining albums in the above-mentioned disc are insufficient, the system control section 5 controls the disc control section 4 so that the set (loaded) disc is caused to be in eject state (step S8).

Respective step processing from the disc set processing of the step S6 up to the disc eject processing of the step S8 are repeated until normal disc is set (loaded).

When the normal disc is set (loaded), i.e., in the case where the set (loaded) disc is formatted in conformity with the format of the predetermined system and the number of remaining frames & the number of remaining albums in the disc were also sufficient, the system control section 5 controls the memory control section 2 so that film set picture data set (stored) in advance in the video memory 22 is delivered to the display section 7. Accordingly, a film set picture as shown in FIG. 9 is displayed on the display section 7.

Thus, user sets (loads) film as shown in the FIG. 5 mentioned above (step S9). At this time, the scanner control section 1 discriminates insertion direction of the set (loaded) film to deliver its discrimination result to the system control section 5.

Figure 9:
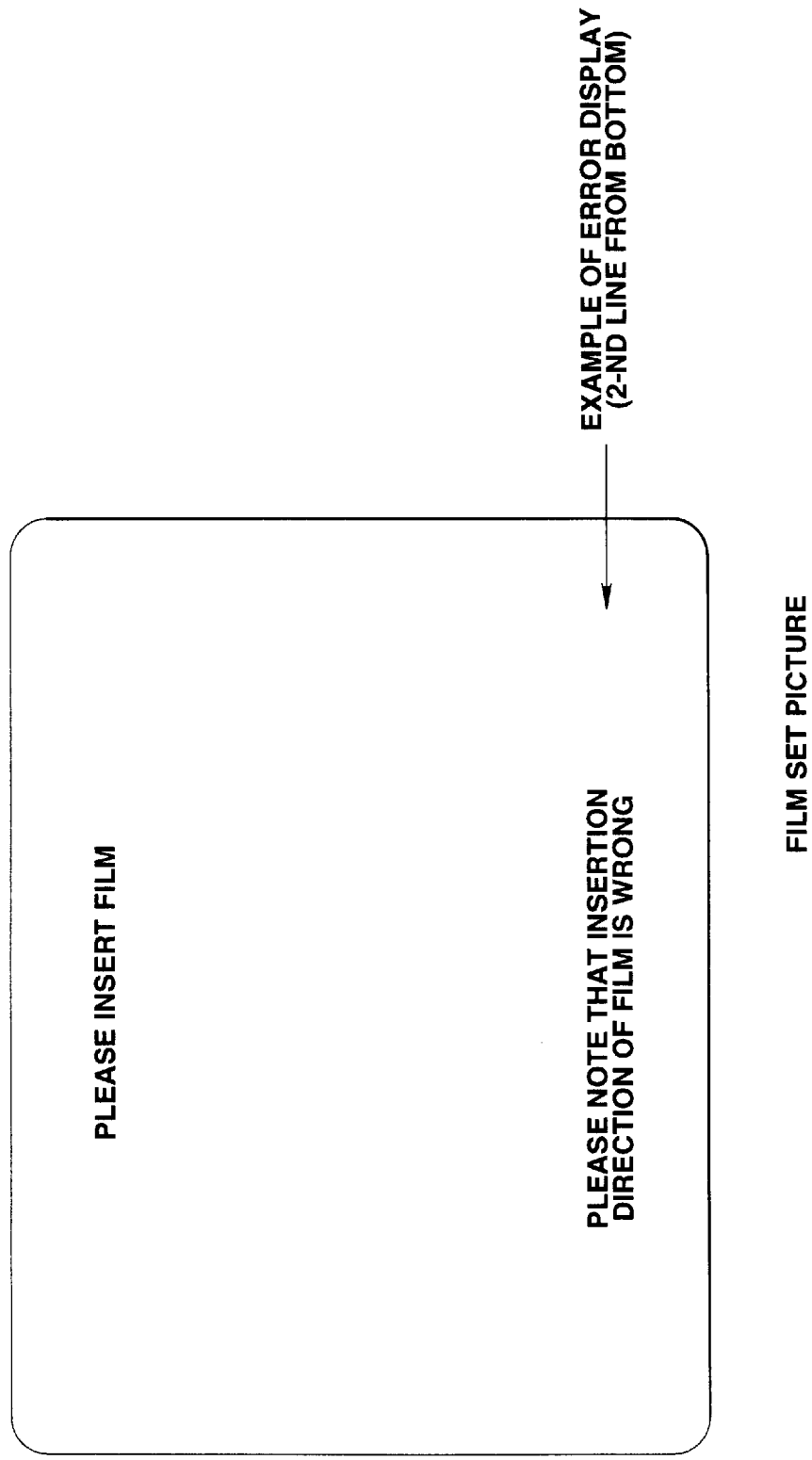
FIG. 9 is a view for explaining film set picture displayed on the display section.

The system control section 5 is operative so that in the case where it has been indicated on the basis of the discrimination result from the scanner control section 1 that the film is not set (loaded) with the emulsion surface thereof being at this side, it conducts a control such that error message indicating that film insertion direction is wrong is displayed within the film set picture as shown in the FIG. 9 mentioned above. User recognizes by this error message that the film insertion direction is wrong to set (load) the film for a second time. Then, the scanner control section 1 discriminates the insertion direction of the film set (loaded) for the second time.

When the film is set (loaded) in the normal direction, the system control section 5 controls the memory control section 2 so that prescan start picture data set (stored) in advance in the video memory 22 is delivered to the display section 7. Accordingly, a prescan start picture as shown in FIG. 10 is displayed on the display section 7.

Figure 10:
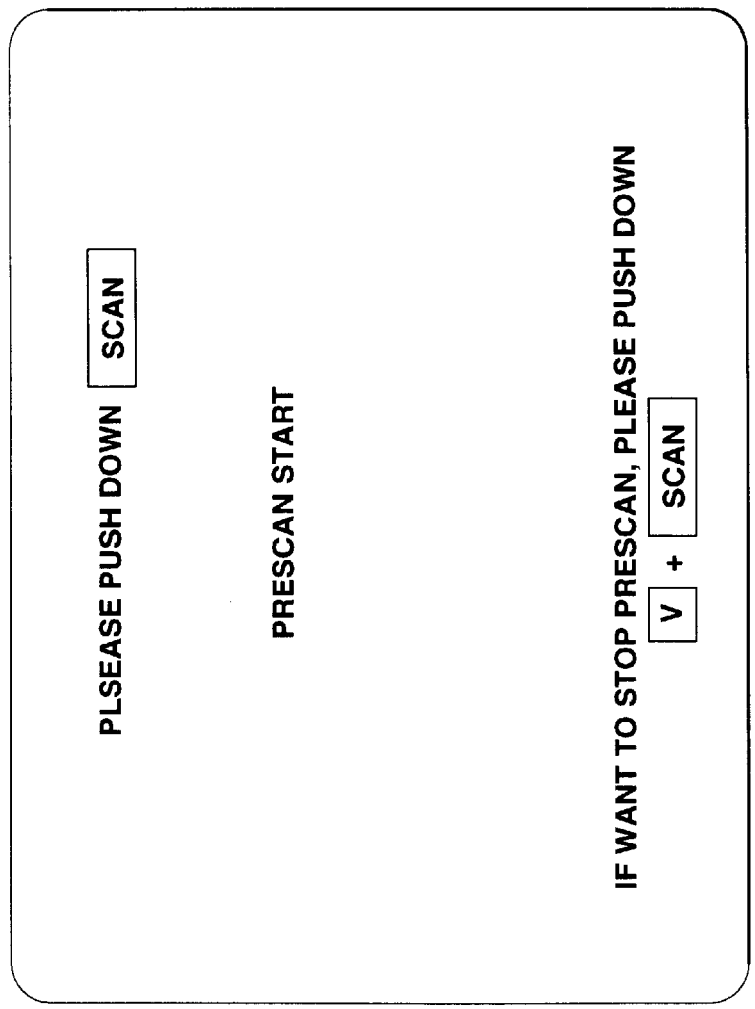
FIG. 10 is a view for explaining prescan start picture displayed on the display section.

In the prescan start picture shown in FIG. 10, when "SCAN" key of the keyboard 6 is pushed down (depressed), the prescan operation starts. Moreover, when "V" key and "SCAN" key of the keyboard 6 are pushed down at the same time, the prescan operation is stopped.

Figure 11:
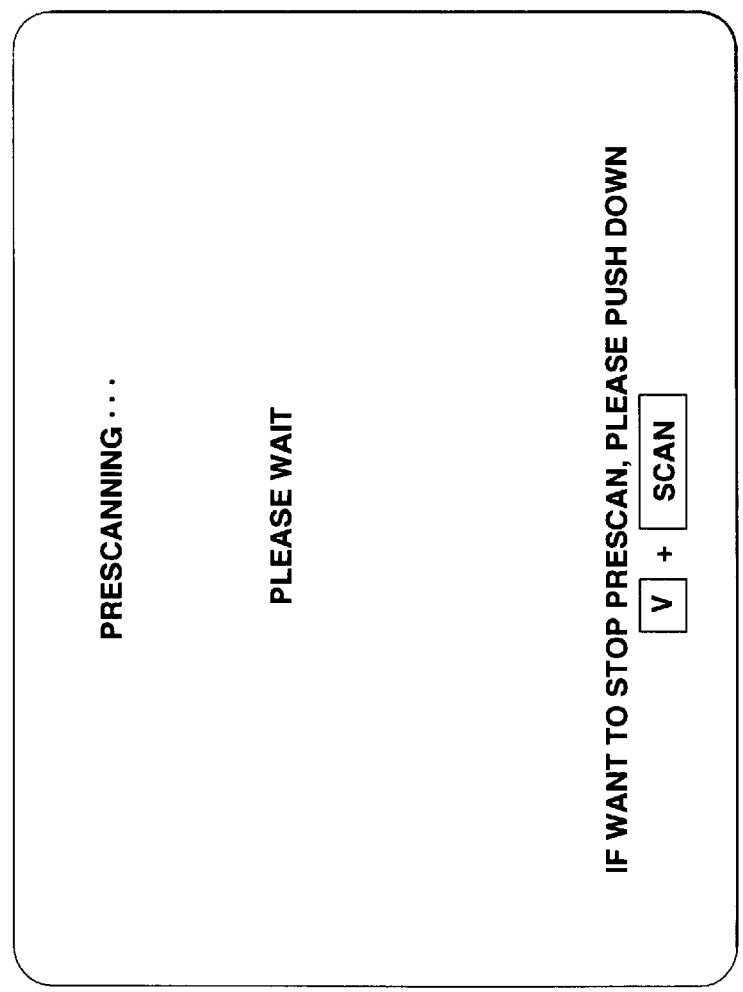
FIG. 11 is a view for explaining prescanning picture displayed on the display section.

In view of this, user pushes down the "SCAN" key of the keyboard 6. Thus, the system control section 5 controls the memory control section 2 so that prescanning picture data set (stored) in advance in the video memory 22 is delivered to the display section 7. Accordingly, a prescanning picture as shown in FIG. 11 is displayed on the display section 7. In addition, the system control section 5 carries out various controls so that the prescan operation is carried out.

Namely, initially, the scanner control section 1 controls the scanner 11 on the basis of control of the system control section 5 so that the set (loaded) film is fed (sent) in the forward direction. Thus, the scanner 11 successively (sequentially) reads, in the forward direction, pictures of respective frames recorded on the film. At this time, the scanner control section 1 carries out auto-focus and light source correction on the basis of the read information when the scanner 11 scans the head (leading) portion where no picture is recorded of the film (step S10).

Then, the scanner 11 successively (sequentially) reads, in the forward directions, pictures of respective frames recorded on the film after the auto-focus and light source correction processing to store picture data thus read into the main memory 21 as digital picture data (step S11).

When pictures of all frames recorded on the film have been read and stored into the main memory 21, i.e., when prescan up to the terminating end of the film has been completed, the scanner control section 1 controls the scanner 11 so that feeding in the forward direction of the set (loaded) film is stopped.

Figure 12:
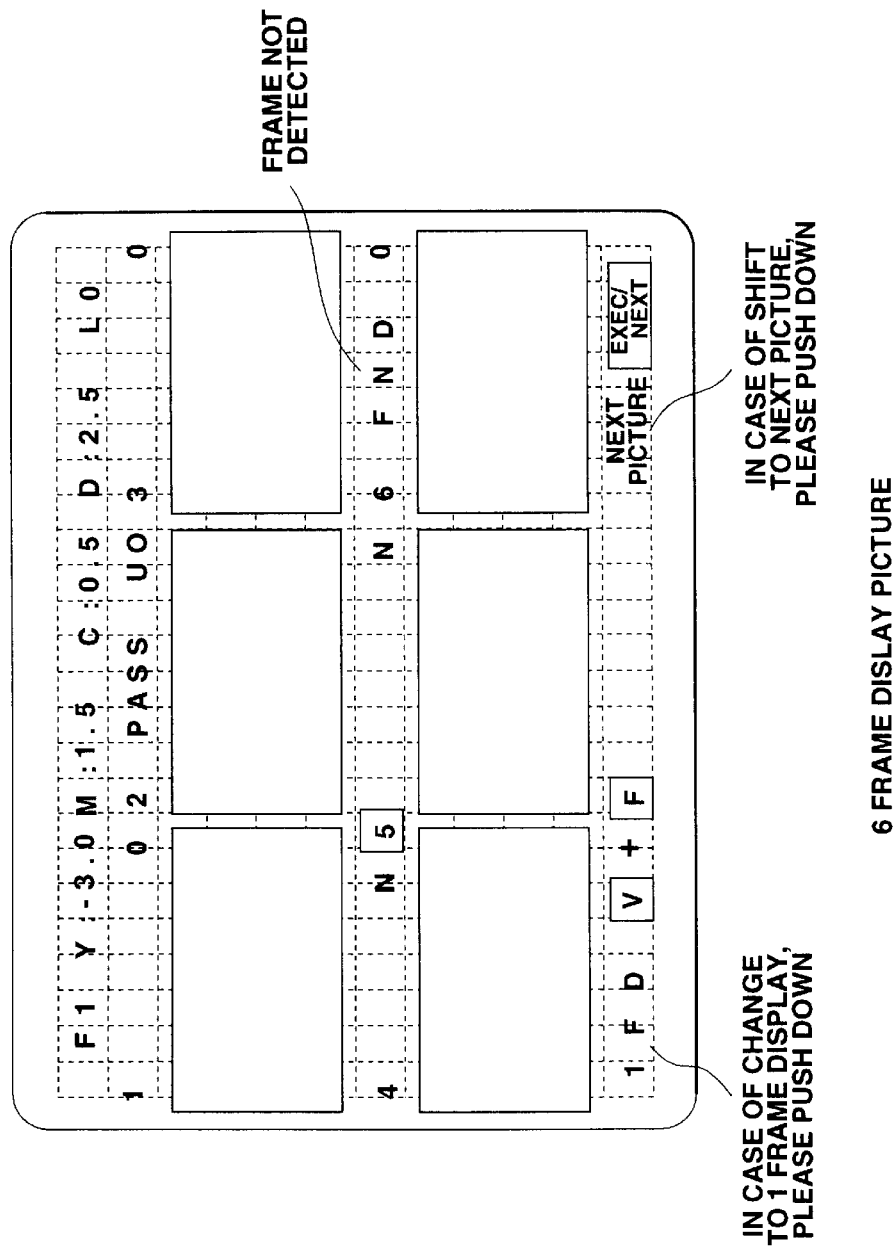
FIG. 12 is a view for explaining six (6) frame display picture displayed on the display section.

When the prescan operation has been completed, the system control section 5 controls the memory control section 2 so that picture data of six (6) frames of the picture data of respective frames stored in the main memory 21 are delivered to the display section 7 through the video memory 22. Accordingly, a picture image based on the picture data of six (6) frames as shown in FIG. 12 is displayed on the display section 7 (step S12).

In this case, if all pictures of six (6) frames caused to undergo picture display on the display section 7 are displayed in the state inverted with respect to upper and lower directions or in the state inverted with respect to left and right directions, it can be judged that the optical film is set (loaded) in the state reversed with respect to face and back (the inside is turned back). Accordingly, in order to invert the picture image displayed on the display section 7, user (operator) carries out an operation to push down, at the same time, "V" key and "Y" key of the keyboard 6. This pushing down operation means the inverting command. When the system control section 5 receives the inverting command from the keyboard 6, it delivers inverting read-out address to the main memory 21 on the basis of the inverting command so that (picture image on display corresponding to) the picture data which is read out from the main memory 21 is inverted. By this operation, the positional relationship in respect of vertical direction of the picture data which has been read from the main memory 21 is in correspondence with the positional relationship in respect of vertical direction of corresponding picture recorded on the optical film. Accordingly, (picture image corresponding to) picture data reasonable (suitable) with respect to the positional relationship in respect of the vertical direction is displayed on the display section 7.

Moreover, once the inverting command is delivered from the keyboard 6 to the system control section 5, also in the case where any other picture data recorded on the same film is read out from the main memory 21, the system control section 5 delivers only the above-described inverting read-out address to the main memory 21. In other words, read-out addresses delivered to the main memory 21 after the above-mentioned inverting command is delivered to the system control section 5 are all inverting read-out addresses. Thus, when reading out, from the main memory 21, picture data of any other frame on the same film, inverting read-out address is automatically delivered to the main memory 21 without necessity of newly issuing (delivering) inverting command. By employing an approach as stated above, even if the film is set (loaded) with respect to the reading apparatus in the state inverted with respect to vertical direction, (picture image corresponding to) picture data in which the upside is not turned down can be displayed on the monitor without setting (loading) the film for a second time, and can be recorded onto the recording medium (step S13).

Moreover, in the case where pictures of six (6) frames which are caused to undergo picture display on the display section 7 are positionally shifted, "V" key and "Album" key of the key board 6 are pushed down at the same time. Thus, the system control section 5 controls the memory control section 2 so that frame position adjustment picture data set (stored) in advance in the video memory 22 is delivered to the display section 7. Accordingly, frame position adjustment picture is displayed on the display section 7. Then, user operates respective keys of the keyboard 6 in the frame position adjustment picture to thereby adjust position of frames. The system control section 5 controls the memory control section 2 so that frame positions are adjusted in accordance with the above-mentioned key operations (step S14).

After frame position adjustment processing as described above is completed, user pushes down "V" key and "Album" key of the keyboard 6 at the same time in the above-mentioned frame position adjustment picture, for example. Thus, the system control section 5 controls the memory control section 2 so that six (6) frame picture data of the previous picture is delivered to the display section 7. Accordingly, the six (6) frame picture shown in FIG. 12 which is the previous picture is displayed on the display section 7.

Further, in the case where there is a need to release respective size modes of PASS/Panorama/Wide, user pushes down "V" key and "+" key of the keyboard 6 at the same time. Thus, the system control section 5 controls the memory control section 2 so that respective size modes of PASS/Panorama/Wide are released (step S15).

Further, in the case where there is a need to display only one arbitrary frame, user pushes down "V" key and "F" key of the keyboard 6 at the same time. Thus, the system control section 5 controls the memory control section 2 so that only one (1) arbitrary frame among pictures of six (6) frames caused to undergo picture display at present is caused to undergo picture display. Accordingly, single (1) frame picture as shown in FIG. 13 is displayed on the display section 7 (step S16).

Figure 13:
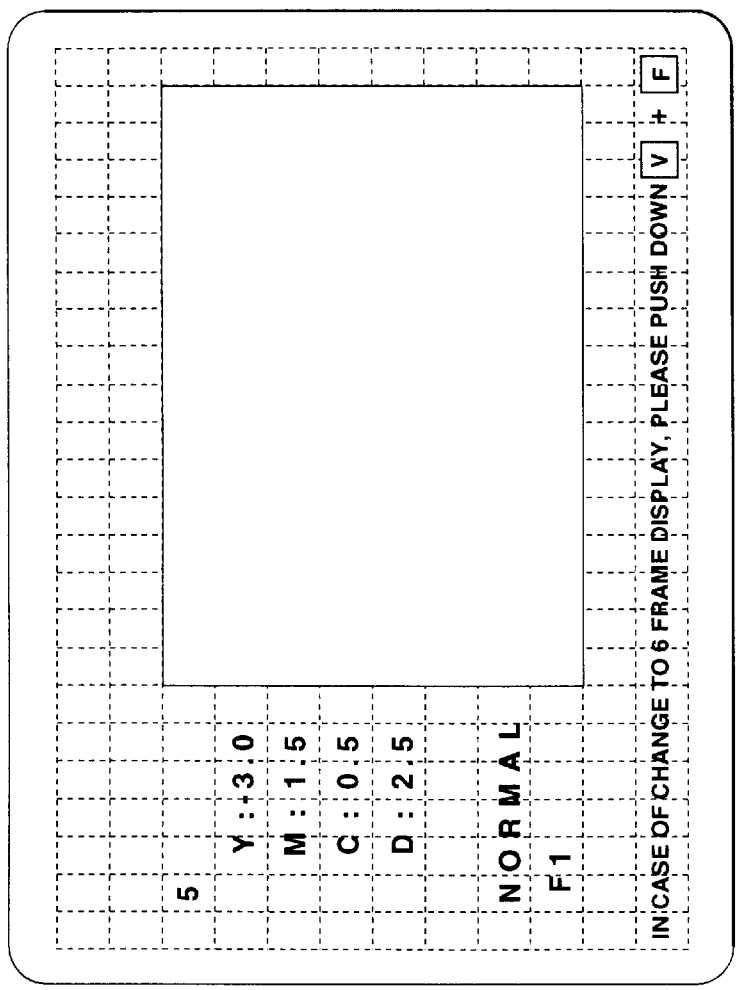
FIG. 13 is a view for explaining single (1) frame display picture displayed on the display section.

Further, in the case where there is a need to return to the previous picture from the single (1) frame picture shown in FIG. 13, user pushes down "V" key and "F" key of the keyboard 6. Thus, the system control section 5 controls the memory control section 2 so that six (6) frame picture data of the previous picture is delivered to the display section 7. Accordingly, the six (6) frame picture shown in FIG. 12 which is the previous picture is displayed on the display section 7.

Then, the system control section 5 generates histogram of respective color components from the picture data of respective frames stored in the main memory 21 to calculate correction reasonable quantity on the basis of the histogram (step S17).

Then, the system control section 5 judges whether or not required respective step processing from the frame position adjustment processing of the step S14 up to the density and color correction processing of the step S17 have been carried out with respect to the picture images of six (6) frames displayed at present on the display section 7 (step S18).

In the case where respective processing of the steps S14~S17 have not yet been completed with respect to the pictures of six frames, the processing from the step S14 are repeated until those processing will have been completed.

In the case where it is judged that respective processing of the steps S14~S17 have been completed with respect to the pictures of six frames (step S18), user pushes down "EXEC/NEXT" key of the keyboard 6.

Then, the system control section 5 judges whether or not respective step processing from the six frame display processing of the step S12 up to the six frame end judgment processing of the step S18 have been carried out with respect to pictures of all frames recorded on the film (step S19).

In the case where the respective processing of the steps S12~S18 have not yet been completed with respect to pictures of all frames recorded on the film, the processing from the step S12 are repeated until those processing have been completed.

In the case where the respective processing of the steps S12~S18 have been completed with respect to the pictures of all frames recorded on the film, user pushes down "EXEC/NEXT" key of the keyboard 6. Thus, the system control section 5 controls the memory control section 2 so that (main) scan start picture data set (stored) in advance in the video memory 22 is delivered to the display section 7. Accordingly, a (main) scan start picture as shown in FIG. 14 is displayed on the display section 7.

Figure 14:
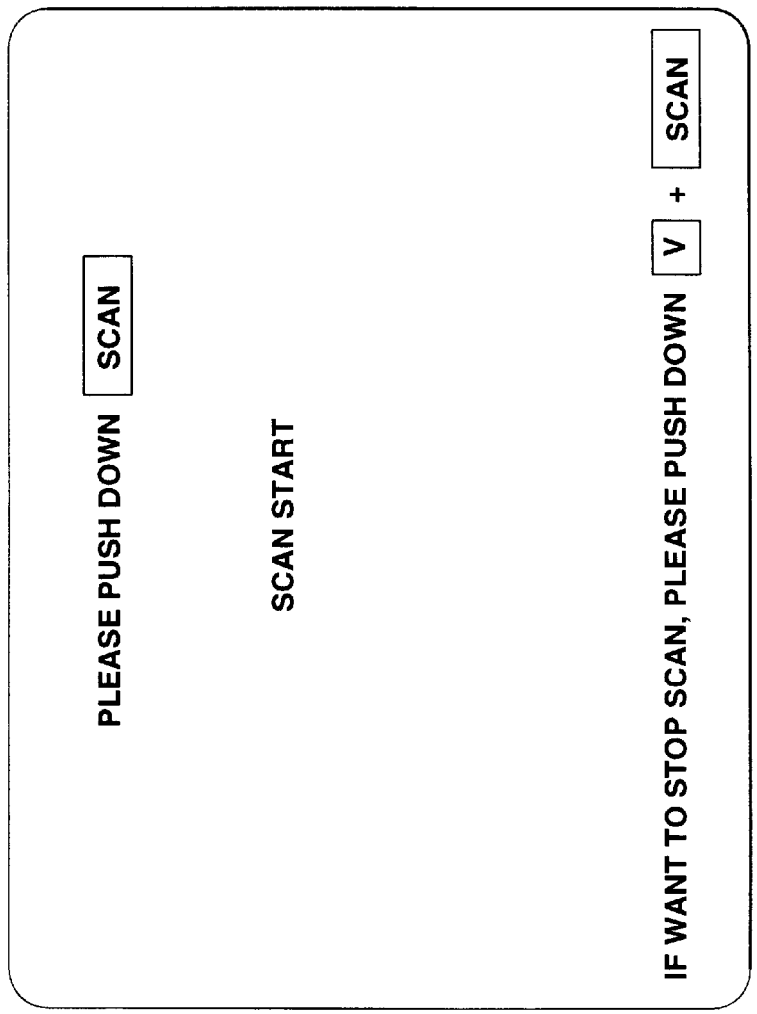
FIG. 14 is a view for explaining (main) scan start picture displayed on the display section.

In the (main) scan start picture shown in FIG. 14, when the "SCAN" key of the keyboard 6 is pushed down, the (main) scan operation starts. Moreover, when the "V" key and the "SCAN" key of the keyboard 6 are pushed down at the same time, the scan operation is stopped.

Figure 15:
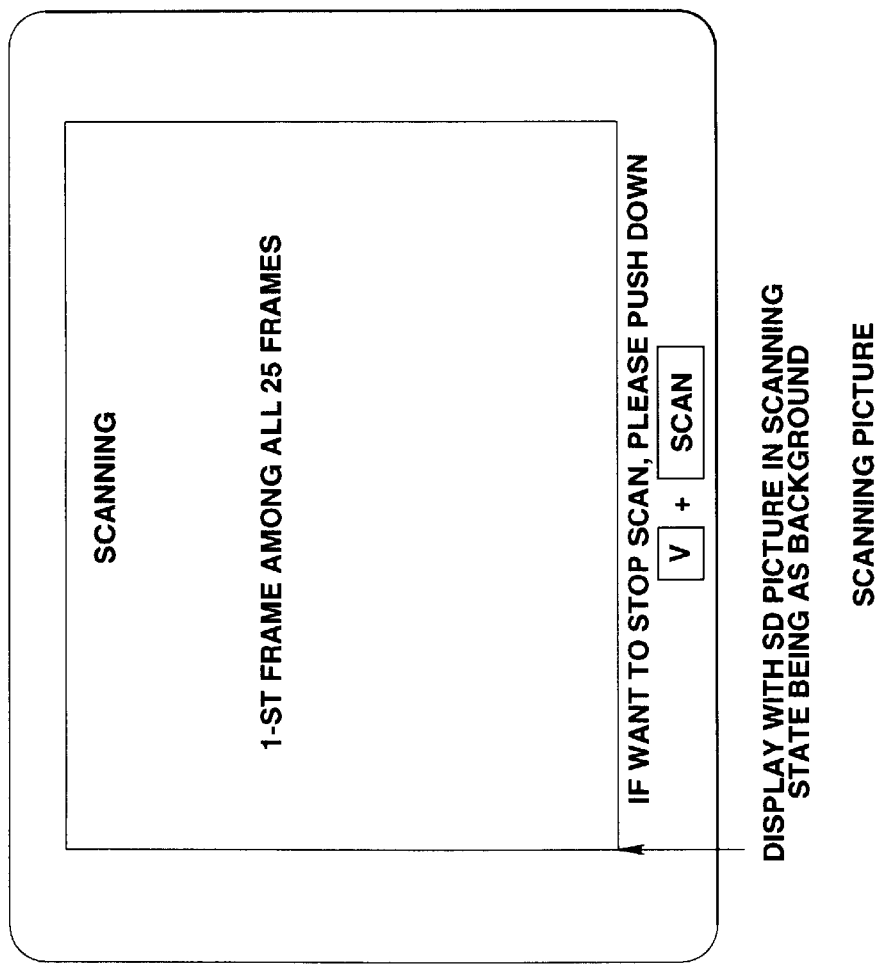
FIG. 15 is a view for explaining (main) scanning picture displayed on the display section.

In view of the above, user pushes down "SCAN" key of the keyboard 6. Thus, the system control section 5 controls the memory control section 2 so that (main) scanning picture data set in (stored) advance in the video memory 22 is delivered to the display section 7. Accordingly, a (main) scanning picture as shown in FIG. 15 is displayed on the display section 7. Then, the system control section 5 carries out various controls so that the (main) scan operation is carried out.

Namely, as shown in FIG. 6, the system control section 5 controls the scanner control section 1 so that the set (loaded) film is fed (sent) in the backward direction at the time of the (main) scan while that film is fed (sent) in the forward direction at the time of prescan. Thus, the scanner 11 successively (sequentially) reads, in the backward direction, pictures of respective frames recorded on the film to store picture data thus read into the main memory 21 as digital picture data (step S20).

Then, the system control section 5 delivers read-out address to the main memory 21. At this time, if the system control section 5 is supplied with inverting command from the keyboard 6 at the step S13, the system control section 5 delivers inverting read-out address to the main memory 21, while in the case where the system control section 5 is supplied with no inverting command, the system control section 5 delivers ordinary read-out address to the main memory 21.

Then, the above-described signal processing section implements correction processing to the picture data which has been read out from the main memory 21 on the basis of the correction reasonable quantity obtained at the time of prescan. The correction processed picture data corrected by the signal processing section is delivered to the display section 7 along with frame No. information indicating frame position on the film of the picture data. Thus, picture image based on the corrected picture data is displayed on the display section 7, and frame No. information corresponding to that picture image is displayed thereon (step S21).

In addition, the signal processing section delivers the correction processed picture data to the disc drive 42 through the disc interface section 41. Thus, the disc drive 42 records, onto the set (loaded) disc, the correction processed picture data from the signal processing section on the basis of control of the disc control section 4 (step S22).

Then, the system control section 5 judges whether or not the (main) scan processing of the step S20 and the recording processing of the step S21 have been carried out with respect to pictures of all frames recorded on the film (step S23).

In the case where respective processing of the steps 20 and 21 have not yet been completed with respect to the pictures of all frames recorded on the film, the processing returns to the step S20. Thus, subsequent respective step processing are repeated.

On the other hand, in the case where respective processing of the steps S20 and S21 have been completed with respect to the pictures of all frames recorded on the film, i.e., when the (main) scan operation up to the terminating end of the film has been completed, the scanner control section 1 controls the scanner 11 so that the feeding in the backward direction of the set (loaded) film is stopped.

Figure 16:
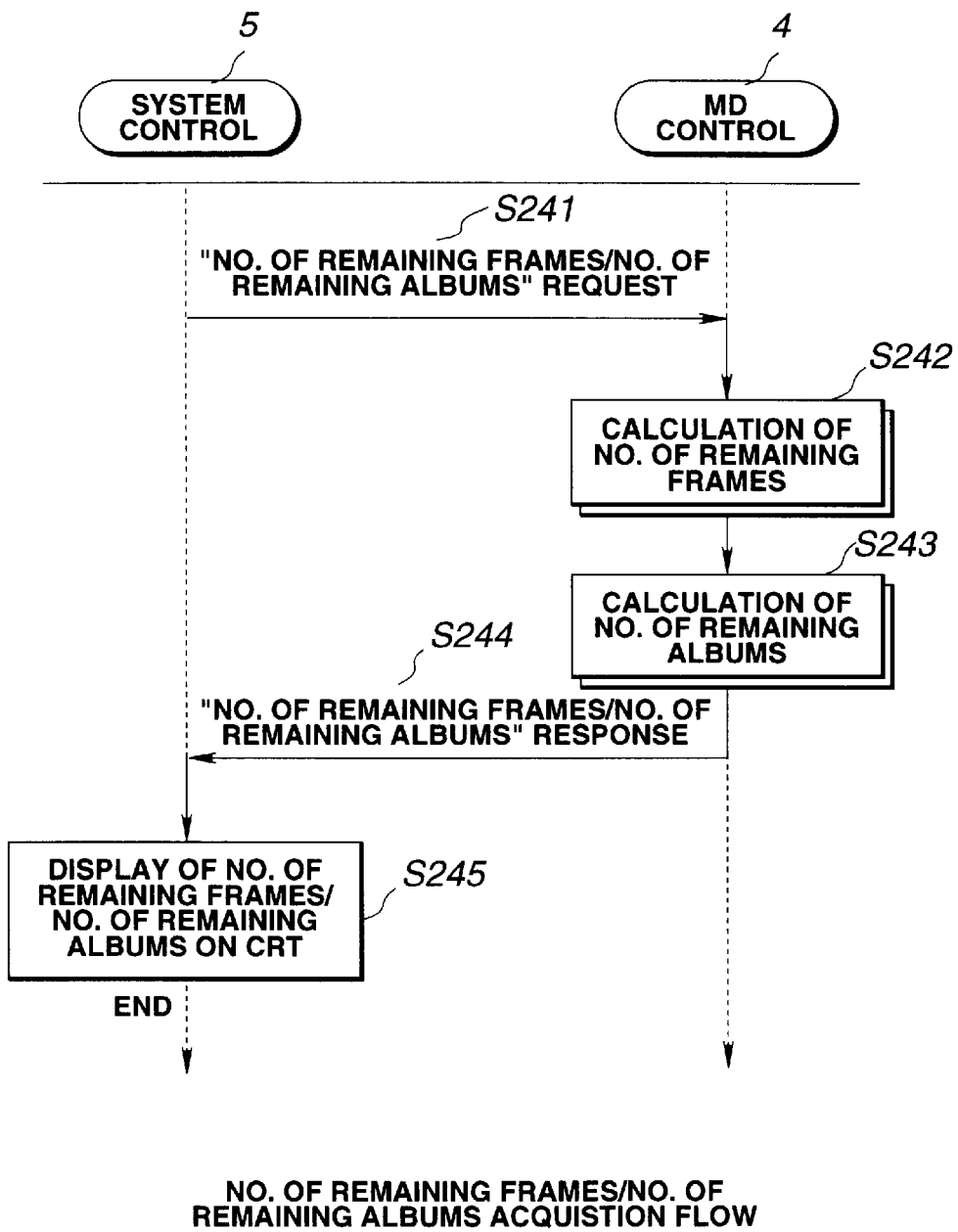
FIG. 16 is a flowchart showing processing of the number of remaining frames/the number of remaining albums acquisition.

Then, the number of remaining frames and the number of remaining albums in the above-described disc are calculated (step S24). FIG. 16 is a flowchart showing acquisition processing for the number of remaining frames and the number of remaining albums of the disc. Explanation will be given below with reference to FIG. 16.

Initially, the system control section 5 issues "No. of remaining frames/No. of remaining albums information" request with respect to the disc control section 4 (step S241).

Thus, the disc control section 4 calculates the number of remaining frames based on the mode of the set recording resolution at the above-described step S5 in response to the "No. of remaining frames/No. of remaining albums information" request from the system control section 5 (step S242).

Namely, when the standard mode is set, since only pictures of the HD resolution can be recorded onto a single disc by 200 frames and data quantity of picture of one frame is 10 clusters as described above, the number of remaining frames in this case can be calculated by the following formula expressed below:

No. of remaining frames=(200×10−(No. of frames of recorded HD pictures×10+No. of frames of recorded UD pictures×20))/10

Moreover, when the high resolution mode is set, since only pictures of UD resolution can be recorded onto a single disc by 100 frames and the data quantity of picture of one frame is 20 clusters as described above, the number of remaining frames in this case can be calculated by the following formula expressed below:

No. of remaining frames=(100×20−(No. of frames of recorded HD pictures×10+No. of frames of recorded UD pictures×20))/20

After the disc control section 4 calculates the number of remaining frames as described above, it calculates No. of remaining albums (step S243). Namely, since the number of albums of single disc is 25 at the maximum as described above, the number of remaining albums can be calculated by the following formula:

No. of remaining albums=25−No. of recorded albums

In this case, information of the number of recorded albums is acquired (provided) from management file of the disc.

Then, the disc control section 4 issues, as response information, the number of remaining frames and the number of remaining albums calculated as described above with respect to the system control section 5 (step S244).

Finally, the system control section 5 controls the memory control section 2 so that remaining quantity picture data for long film set (stored) in advance in the video memory 22 is delivered to the display section 7 and picture data based on the number of remaining frames and the number of remaining albums from the disc control section 4 is delivered. Accordingly, as shown in FIG. 17, remaining quantity picture for long film in which information of the number of remaining frames and the number of remaining albums obtained as described above is indicated is displayed on the display section 7 (step S245).

Figure 17:
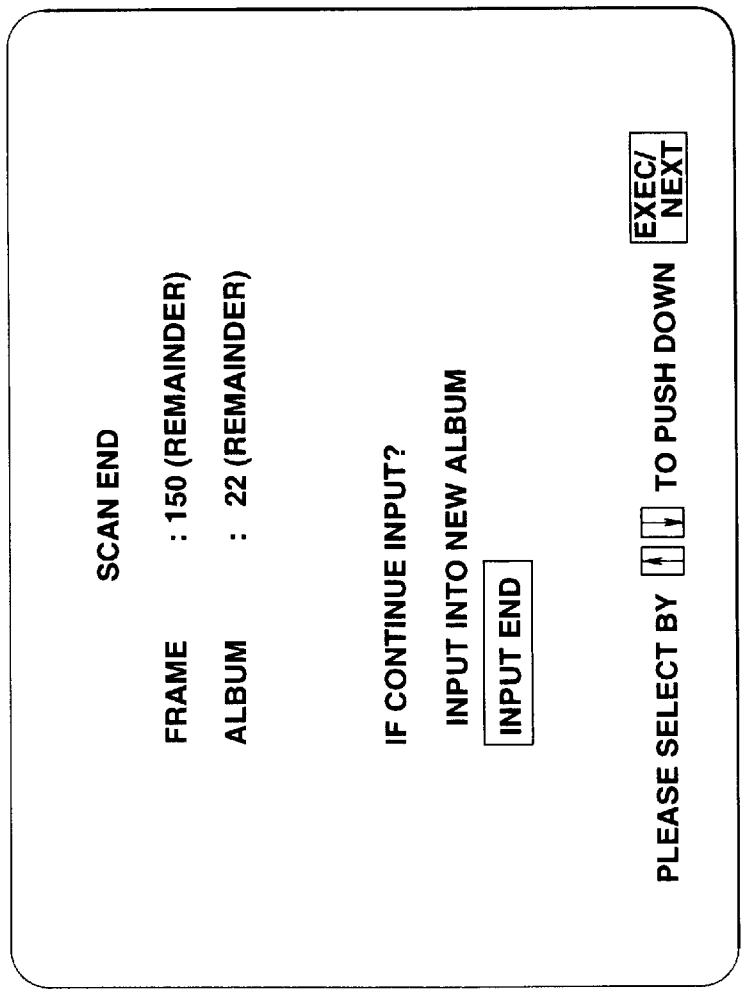
FIG. 17 is a view for explaining (main) scan end picture for long (picture) film displayed on the display section.

In this picture reading apparatus 100, since single film is dealt as single album as described above, "Input into New Album" or "Input End" can be selected in the remaining quantity picture for long film shown in FIG. 17. Accordingly, user makes selection by arrow "↓", "↑" keys of the keyboard 6.

The system control section 5 judges, as shown in the FIG. 6 mentioned above, on the basis of selection by the key operation whether or not input is continued (step S25).

In the case where input is continued, i.e., in the case where "Input into New Album" is selected in the remaining quantity picture for long film shown in FIG. 17, processing returns to the film set processing of the step S9 shown in FIG. 5. Thus, subsequent respective step processing are repeated.

In the case where input ends, user pushes down "EXEC/NEXT" key of the keyboard 6. Thus, the system control section 5 controls the memory control section 2 so that index print setting picture data set (stored) in advance in the video memory 22 is delivered to the display section 7. Accordingly, index print setting picture is displayed on the display section 7. User sets the number of index pictures and the print paper size in accordance with the operation designation displayed within the index print setting picture (step S26).

Figure 18:
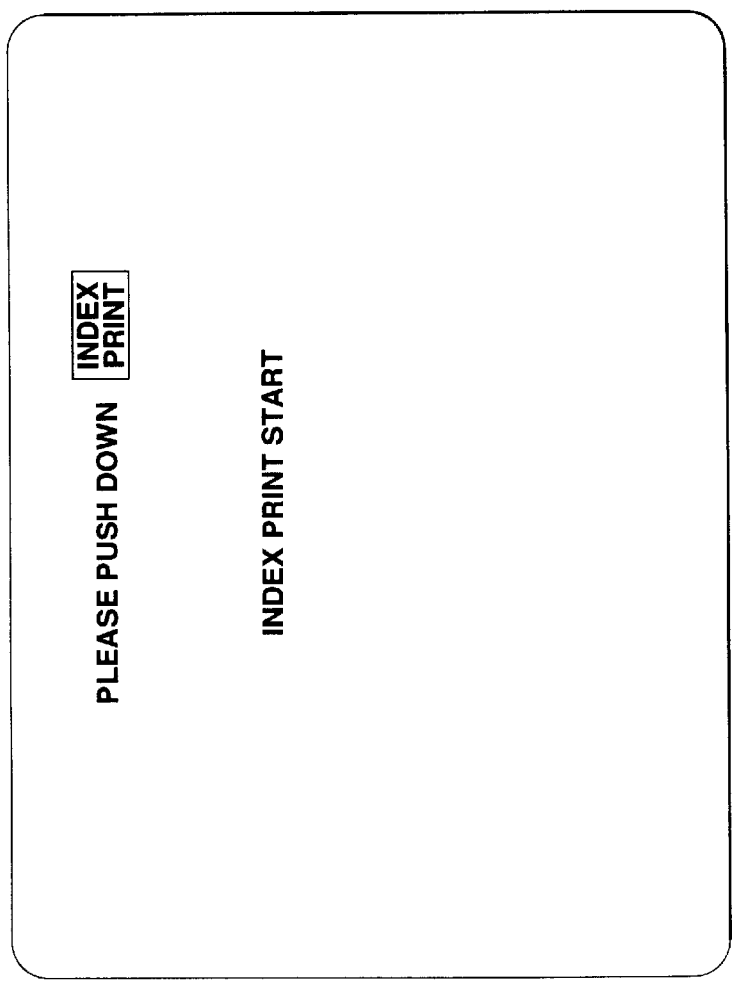
FIG. 18 is a view for explaining index print start picture displayed on the display section.

When the index print setting processing is completed, the system control section 5 controls the memory control section 2 so that index print start picture data set (stored) in advance in the video memory 22 is delivered to the display section 7. Accordingly, an index print start picture as shown in FIG. 18 is displayed on the display section 7.

Figure 19:
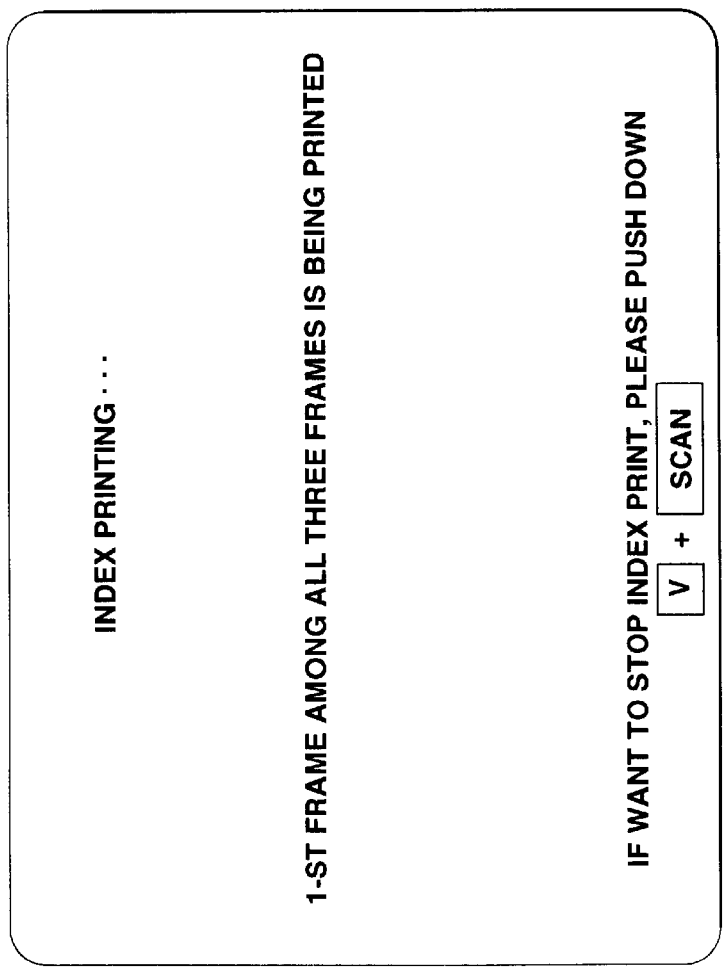
FIG. 19 is a view for explaining index printing picture displayed on the display section.

Since such picture setting has been made, user pushes down "INDEX PRINT" key of the keyboard 6. Thus, the system control section 5 controls the memory control section 2 so that index printing picture data set (stored) in advance in the video memory 22 is delivered to the display section 7. Accordingly, an index printing picture as shown in FIG. 19 is displayed on the display section 7. Then, the system control section 5 controls the printer control section 3 so that the index print operation is carried out (step S27).

Then, the printer control section 3 judges whether or not entire index information of pictures (frames) set at the step S25 has been printed (step S28).

In the case where the entire print operation has not yet been completed, the processing returns to the index print processing of the step S26 to continue print operation.

In the case where the entire print operation has been completed, the system control section 5 controls the memory control section 2 so that index print end picture data set (stored) in advance in the video memory 22 is delivered to the display section 7. Accordingly, an index print end picture as shown in FIG. 20 is displayed on the display section 7.

Figure 20:
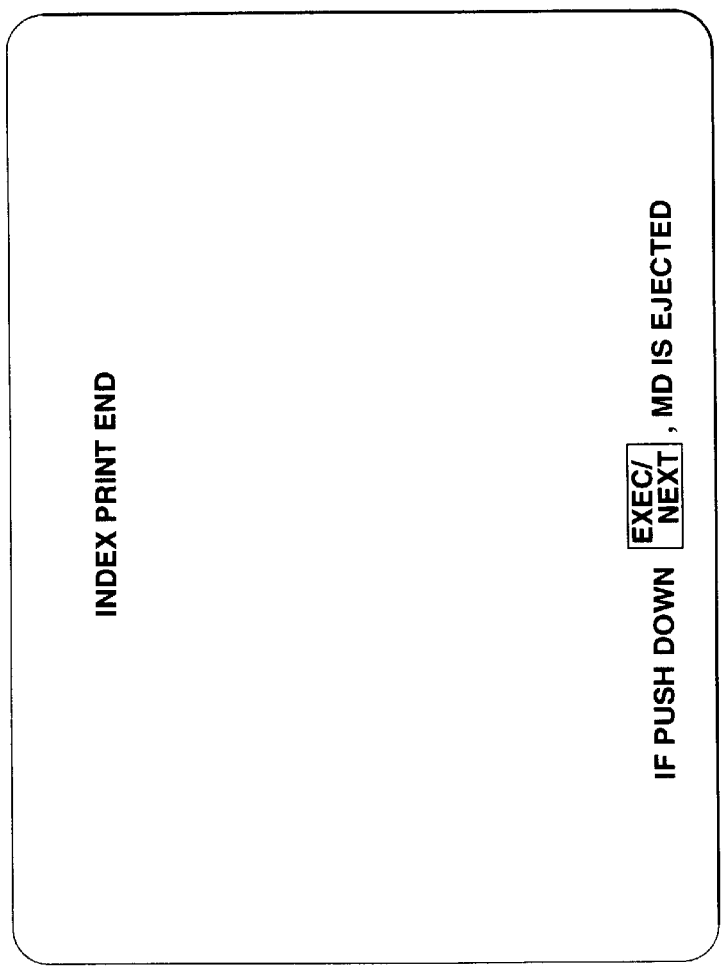
FIG. 20 is a view for explaining index print end picture displayed on the display section.

Finally, user pushes down "EXEC/NEXT" key of the keyboard 6 in the index print end picture shown in FIG. 20. Thus, the system control section 5 controls the disc control section 4 so that the disc set (loaded) at the disc drive 42 is brought into the eject state. In addition, the system control section 5 controls the memory control section 2 so that the initial picture data set in advance in the video memory 22 is delivered to the display section 7. Accordingly, the disc is brought into the eject state. Thus, the initial picture shown in FIG. 7 is displayed on the display section 7 (step S29).

As described above, in this picture reading apparatus, since such an approach is employed to calculate the number of remaining frames from the number of recordable frames and the number of recorded (already recorded) frames of the disc obtained in accordance with the set recording resolution before and after the (main) scan is carried out to record pictures of respective frames onto the disc to display the number of remaining frames on the display section 7. For this reason, user is not required to check every time remaining capacity of the disc, and can thus confirm intuitively and concretely how many number of recordable frames is left (remaining). Accordingly, user can efficiently carry out recording work onto the disc. This can result in great advantage particularly in the case of recording of a large quantity of films.

Moreover, since a single film is dealt as a single album, it is possible to easily confirm switching point between films in the disc on which plural films are recorded. Accordingly, re-utilization and retrievability of the disc can be improved.

Further, since there is employed a feed system such that the film is fed (sent) in the forward direction at the time of the prescan and the film is fed (sent) in the backward direction at the time of the (main) scan, it is possible to rapidly and securely read pictures of respective frames recorded on the film. Accordingly, the processing time can be reduced. For this reason, the working efficiency can be improved.

Further, in this picture reading apparatus 100, after the inverting command is delivered from the keyboard 6 to the system control section 5, the system control section 5 only delivers the above-described inverting read-out addresses to the main memory 21. Accordingly, even if the optical film is erroneously set (loaded) in the state reversed with respect to the face and back (in the state where the inside is turned out), (picture image corresponding to) picture data suitable (reasonable) with respect to vertical direction can be displayed on monitor without necessity of exchanging the film for a second time.

It is to be noted that while explanation has been given in the flowchart shown in FIGS. 4~6 in connection with the case where long film is handled, in the case where, e.g., film cut every six frames is handled, a remaining quantity picture for film cut every six frames as shown in FIG. 21 is displayed in place of the remaining quantity picture for long film shown in FIG. 17 which is caused to undergo picture display at the step S23. Namely, in this case, with respect to continuation of input, any one of "Input into new album", "Input into the same album" and "Input ends" can be selected. Since different operation menus with respect to the long film and the film cut every six frames are respectively used as stated above, the working efficiency can be further improved.

In addition, in the case where the index print is in OFF state in the index print processing of the step S25, whether or not print is carried out can be selected.

What is claimed is:

1. A picture reading apparatus comprising:

picture reading means for moving an optical film on which plural pictures are recorded in frame units to read, in the frame units, the pictures recorded on the optical film to convert them into electric picture data, memory means for temporarily storing the picture data obtained by the picture reading means, signal processing means for implementing processing to the picture data obtained by the picture reading means, recording means for recording, onto a recording medium, the picture data to which the processing has been implemented by the signal processing means, picture display means for displaying picture based on the picture data to which the processing has been implemented by the signal processing means, and control means for carrying out control of respective operations of the picture reading means, the memory means, the signal processing means and the recording means to successively read, in the frame units, the plural pictures recorded on the optical film to record, onto the recording medium, picture data of respective frames by the recording means, wherein the apparatus comprises inverting command means for delivering, to the control means, inverting command for inverting relative position of the picture data in regard to upper and lower directions thereof under control of write-in or read-out operation of the picture data with respect to the memory means, and wherein the control means controls the write-in or read-out operation of the picture data with respect to the memory means so as to invert relative position of the picture data in regard to upper and lower directions in accordance with the inverting command from the inverting command means.

2. A picture reading apparatus as set forth in claim 1, wherein the control means is operative so that when the inverting command from the inverting command means is given thereto, it controls write-in or read-out operation of picture data with respect to the memory means so as to respectively obtain inverted picture data with respect to all the pictures on the optical film.

3. A picture reading apparatus as set forth in claim 2, wherein the control means is operative so that after the inverting command from the inverting command means is given thereto, it carries out a control to allow read-out addresses with respect to the memory means to be only inverting read-out addresses.

4. A picture reading apparatus comprising:

picture reading means for reading, in frame units, plural pictures recorded on an optical film to convert them into electric picture data;

memory means for temporarily storing the picture data obtained by the picture reading means;

signal processing means for implementing processing to the picture data obtained by the picture reading means;

recording means for recording, onto a recording medium, the picture data to which the processing has been implemented by the signal processing means;

control means for controlling the operation of the picture reading means so as to correspond to prescan operation and main scan operation, and for delivering read-out address to the memory means; and inverting command means for delivering, to the control means, inverting command for obtaining inverted picture data inverted in regard to upper and lower directions thereof with respect to the picture data stored in the memory means, wherein the control means is operative so that when the inverting command is given from the inverting command means at the time of the prescan, it delivers inverting read-out addresses to the memory means in reading out all the picture data on the optical film temporarily stored in the memory means.

5. A picture reading apparatus comprising: picture reading means for reading, in frame units, plural pictures recorded on an optical film to convert them into electric picture data:

memory means for temporarily storing the picture data obtained by the picture reading means;

signal processing means for implementing processing to the picture data obtained by the picture reading means;

recording means for recording, onto a recording medium, the picture data to which the processing has been implemented by the signal processing means;

control means for controlling the operation of the picture reading means so as to correspond to prescan operation and main scan operation, and for delivering read-out address to the memory means; and inverting command means for delivering, to the control means, inverting command for obtaining inverted picture data inverted in regard to upper and lower directions thereof with respect to the picture data stored in the memory means, wherein the control means is operative so that after the inverting command is given thereto from the inverting command means, it delivers, to the memory means, inverting read-out addresses for all the picture data in reading out the picture data from the memory means so as to respectively obtain the inverted picture data corresponding to all the picture data on the same optical film.

* * * * *